Nov. 30, 1965 A. P. TOWNE 3,221,100
METHOD AND APPARATUS FOR TESTING HEARING
Original Filed June 27, 1960 9 Sheets-Sheet 1
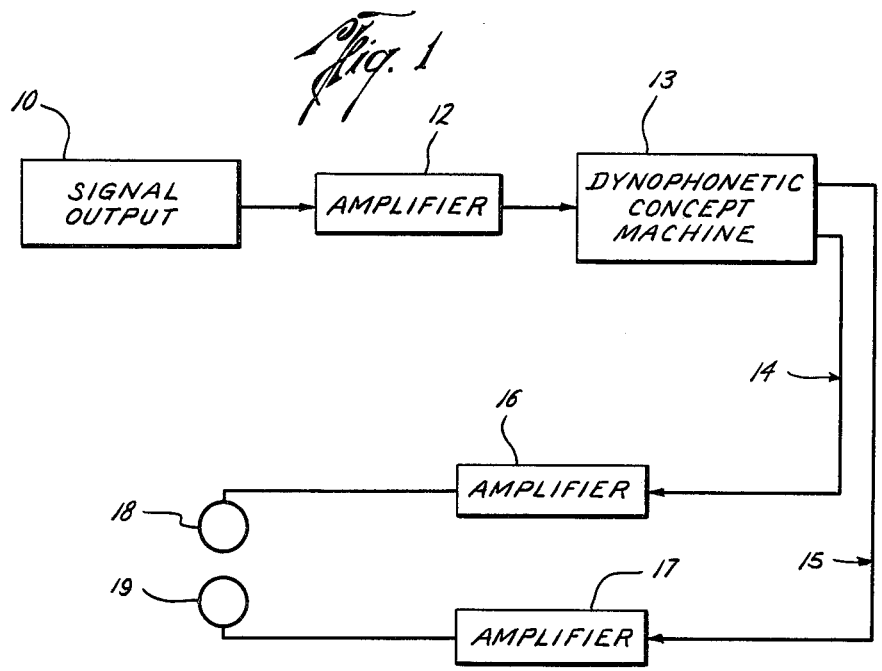
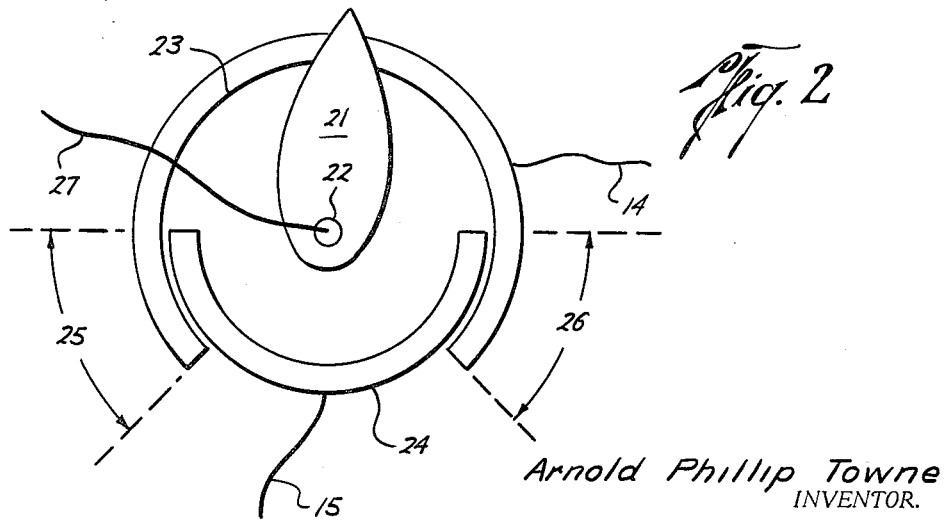
Arnold Phillip Towne
INVENTOR.

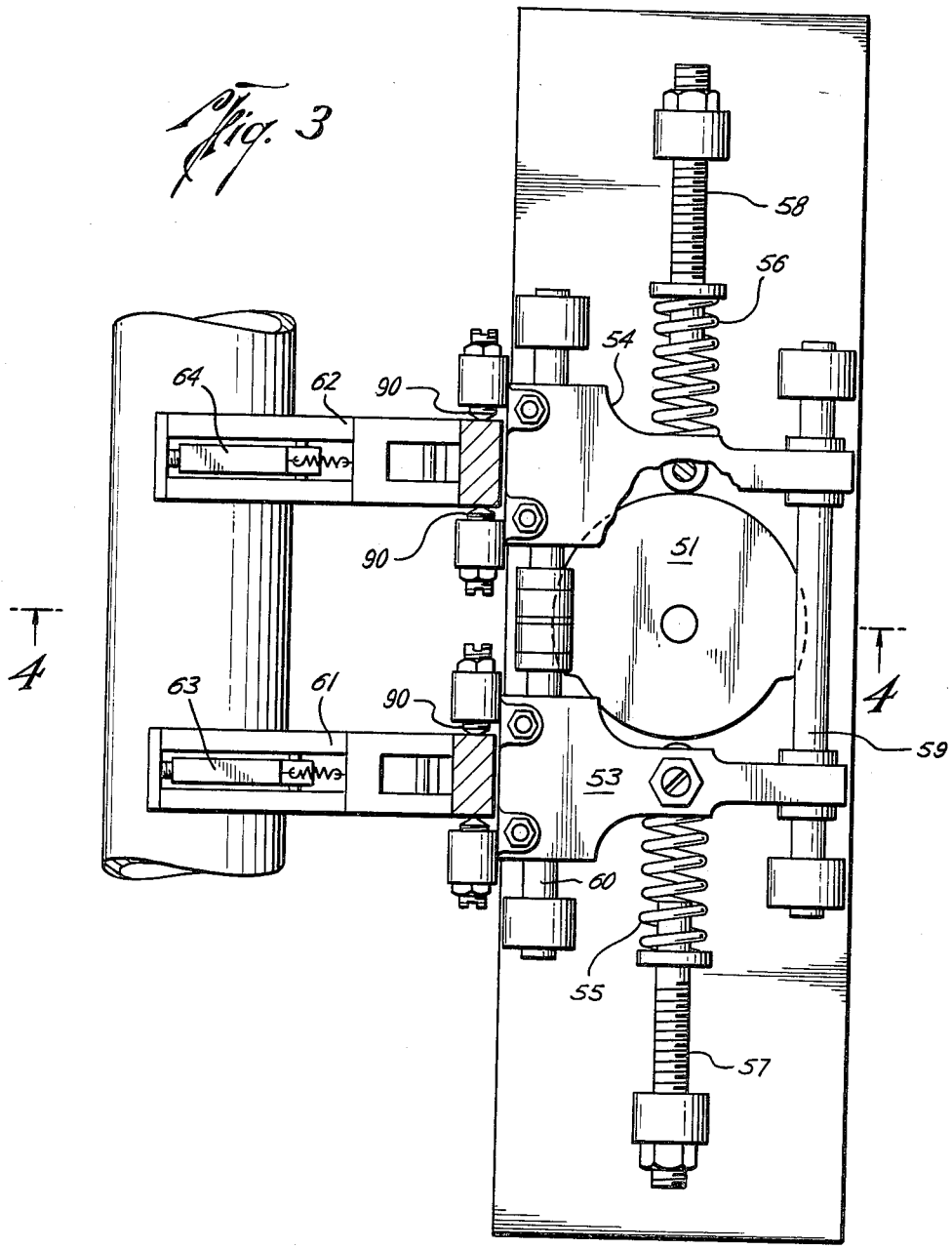

Nov. 30, 1965  A. P. TOWNE  3,221,100
METHOD AND APPARATUS FOR TESTING HEARING
Original Filed June 27, 1960  9 Sheets-Sheet 3
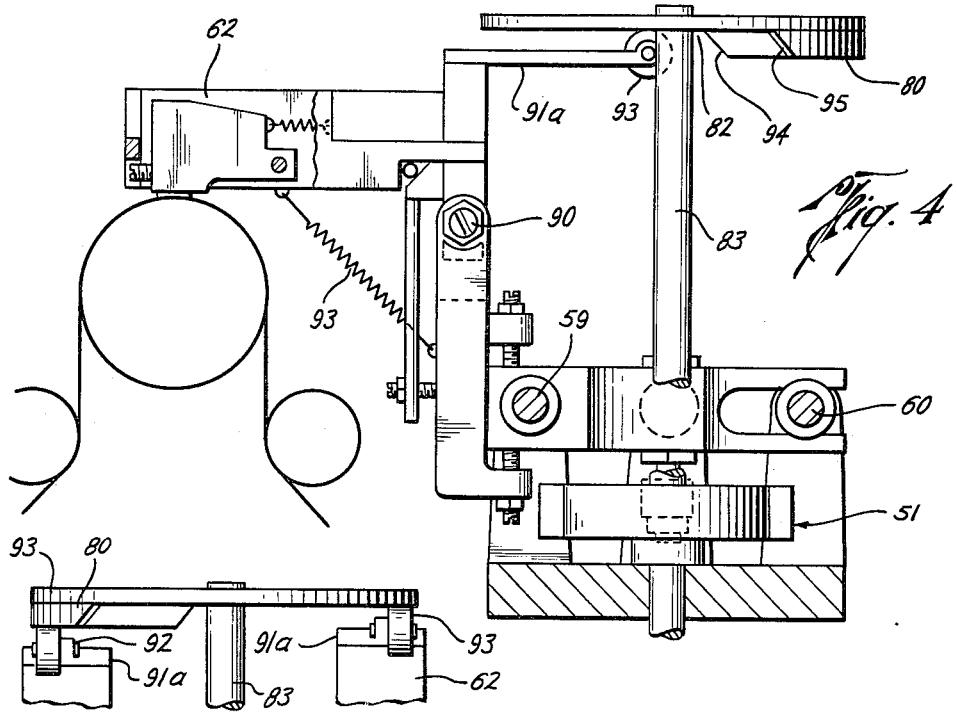
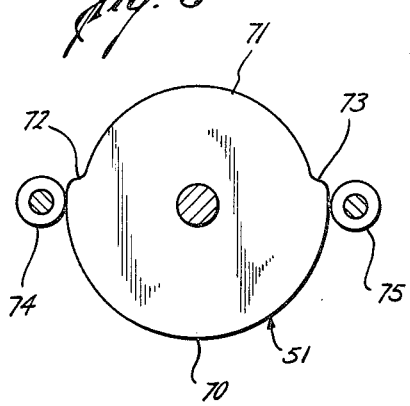
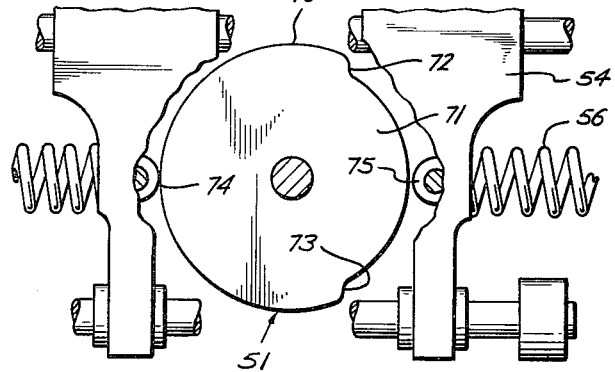
Arnold Phillip Towne
INVENTOR.
BY
ATTORNEY Nov. 30, 1965　　　　　　A. P. TOWNE　　　　　　3,221,100
METHOD AND APPARATUS FOR TESTING HEARING
Original Filed June 27, 1960　　　　　　　　　　9 Sheets-Sheet 4

Arnold Phillip Towne
INVENTOR.

BY

ATTORNEY

Nov. 30, 1965     A. P. TOWNE     3,221,100
METHOD AND APPARATUS FOR TESTING HEARING
Original Filed June 27, 1960     9 Sheets-Sheet 5
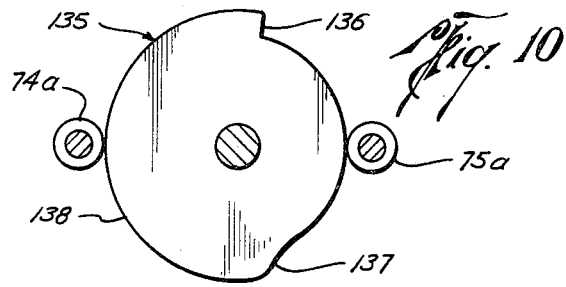
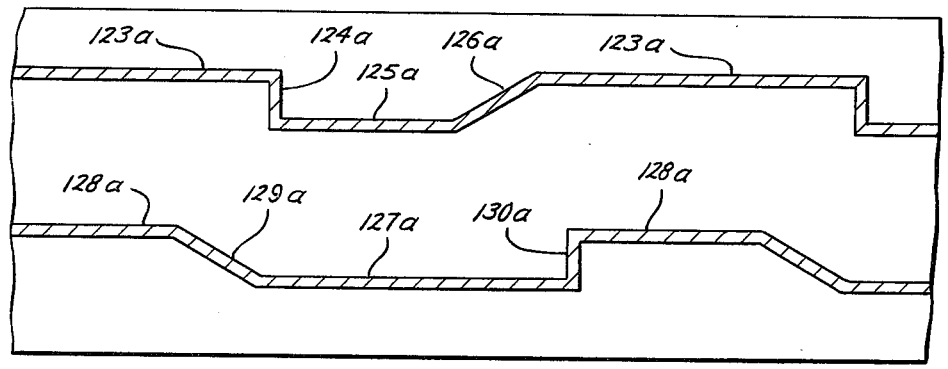
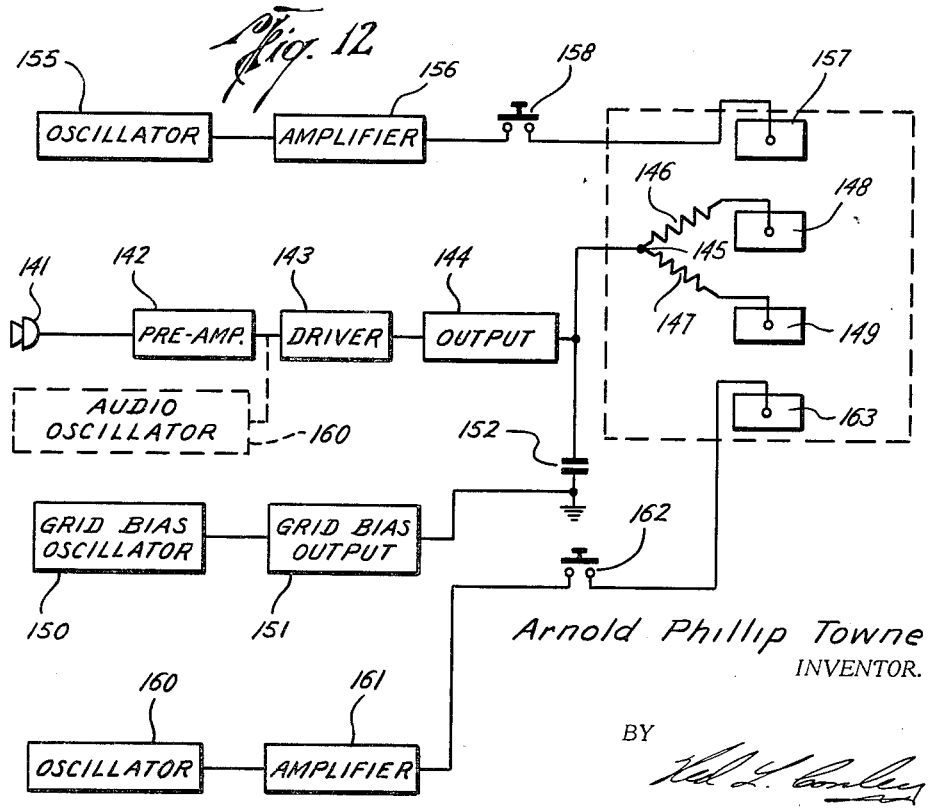
Arnold Phillip Towne
INVENTOR.
BY
ATTORNEY

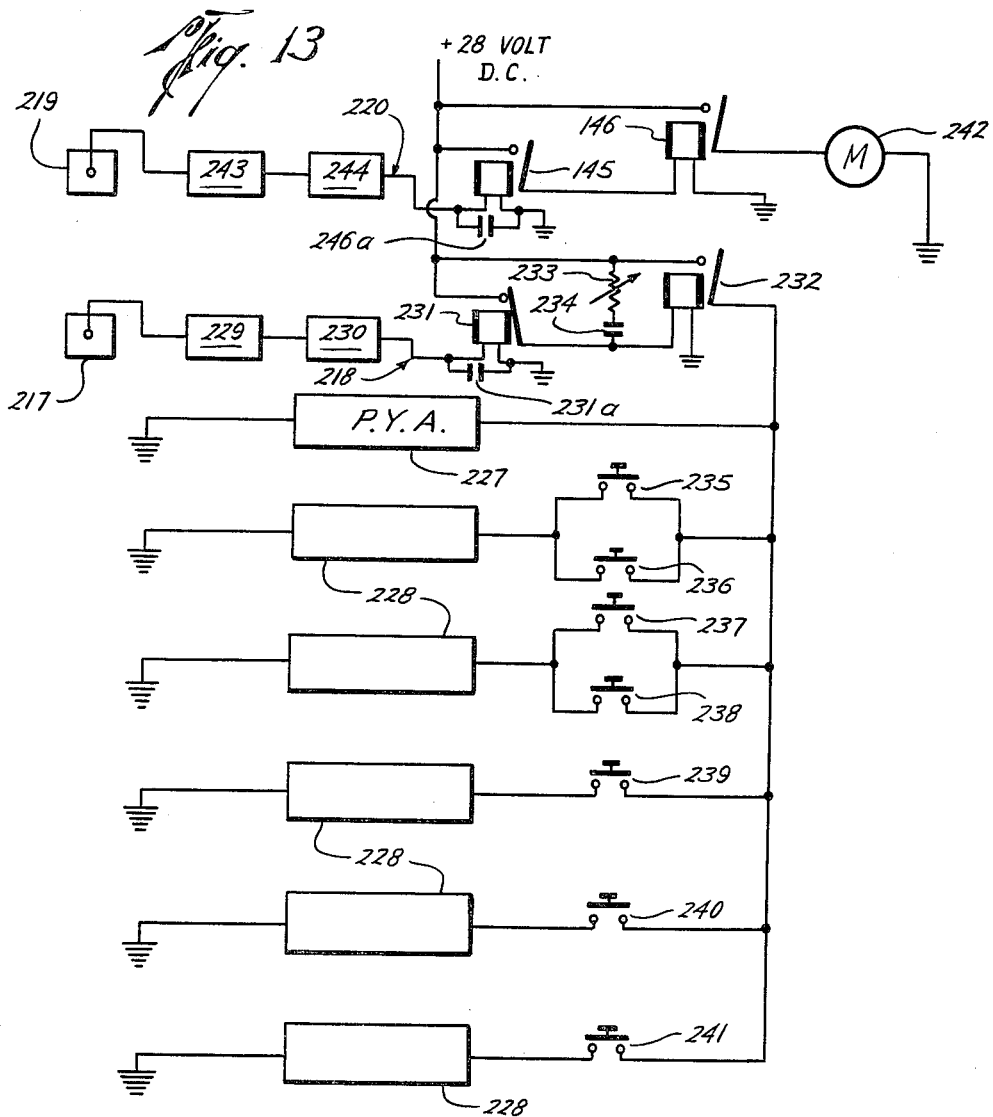
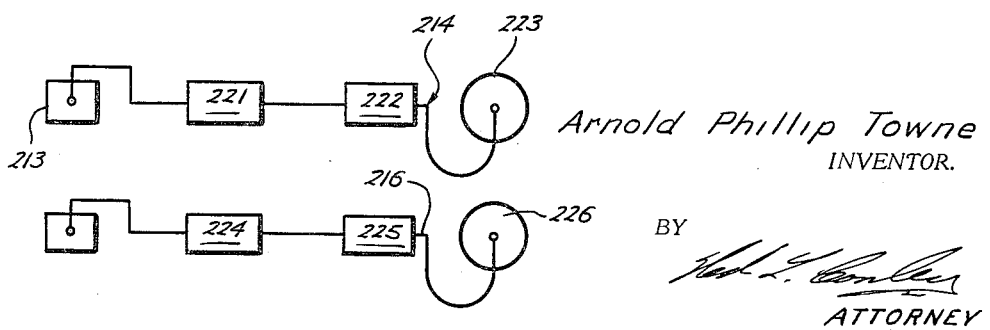

Arnold Phillip Towne
INVENTOR.

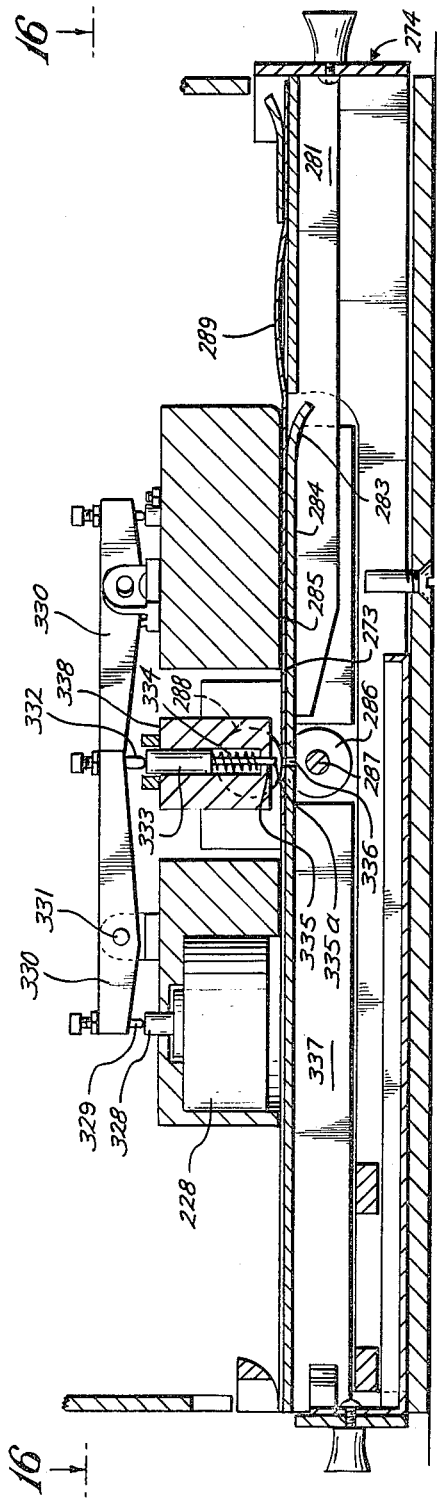

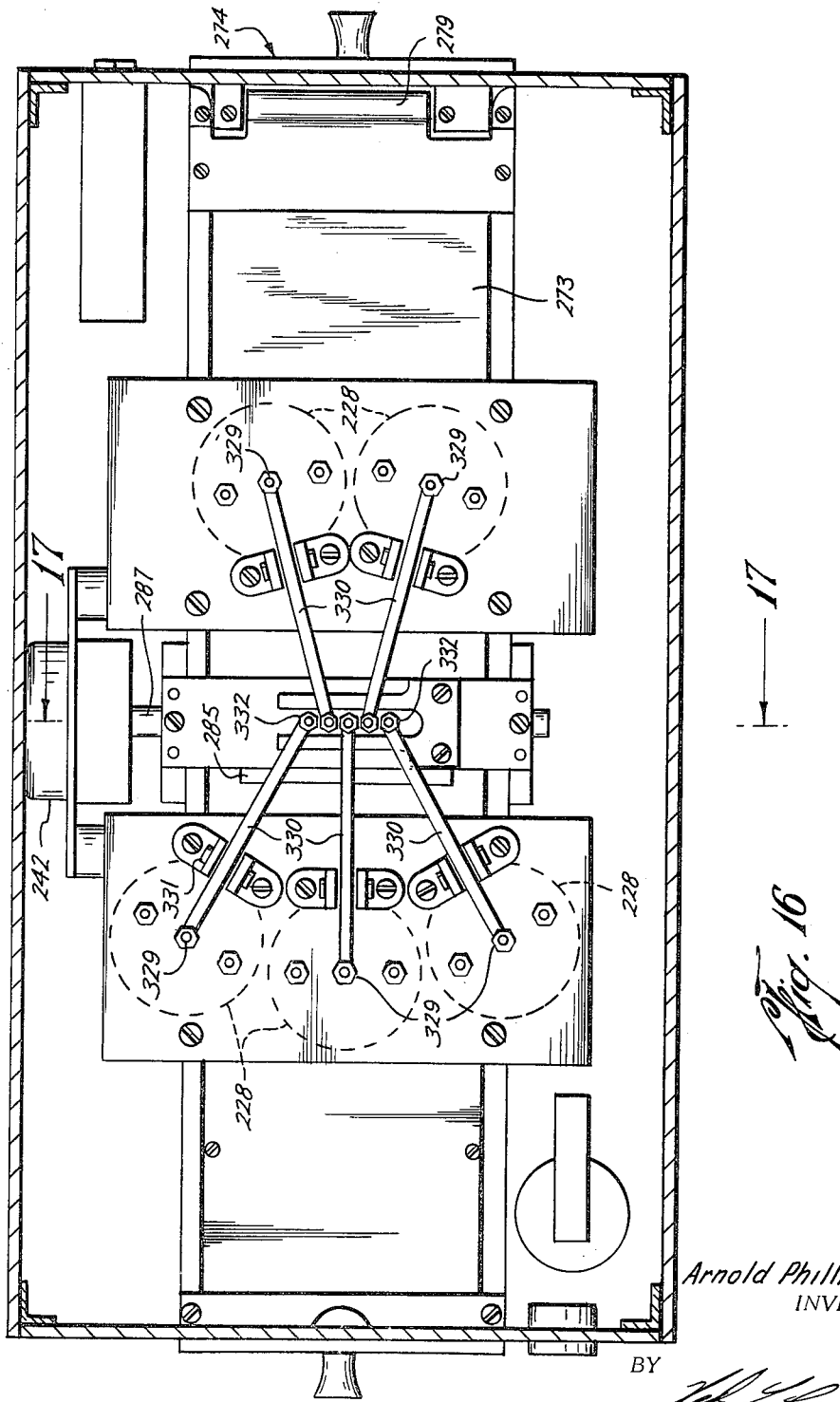

United States Patent Office 3,221,100
Patented Nov. 30, 1965

3,221,100
METHOD AND APPARATUS FOR TESTING HEARING
Arnold Phillip Towne, Kansas City, Mo., assignor, by mesne assignments, of one-third each to E. J. Mosher and M. P. Sullivan, both of Houston, and Harry J. Mosser, Alice, Tex.
Continuation of application Ser. No. 38,964, June 27, 1960. This application July 17, 1964, Ser. No. 384,577
24 Claims. (Cl. 179—1)

This invention relates to the testing of hearing, and more particularly to such testing by conducting sounds to the ears of a test subject. This application is a continuation of application Serial No. 38,964, filed June 27, 1960, now abandoned, which is a continuation-in-part of my copending application Serial No. 694,663, filed November 5, 1957, now abandoned.

Heretofore, the art has relied on the basic concept that the loudness or intensity of sound was a dominant factor in the design of a hearing test. The audiometer has been the basic tool. By its use, at each of various frequencies, sounds of increasing intensity are conducted to an ear of the test subject. The subject gives a predetermined response when the sound first becomes audible to his ear. Such a test has numerous limitations.

First, it is highly subjective, consequently a malingerer is hard to expose. Indeed one with faulty hearing who seeks to pass the test is sometimes difficult to expose.

Secondly, the test is based entirely on loudness of certain primary sounds each at a constant frequency. I have determined by repeated observation that one may suffer certain hearing losses or defects that do not necessarily correlate with results based on loudness of such primary sounds.

Thirdly, as the test is usually conducted on only one ear at the time, the coordination between the hearing of the two ears is in no way tested.

Fourthly, a hearing test given by a trained examiner may also involve speech testing with certain prescribed word lists, along with audiometric testing for single frequency tones and, likewise, the conveyance of single frequency tones by bone conduction, as well as air conduction. The examiner thereby receives a series of data from separate tests which may show different responses to each type of test. Such testing does not provide a means for accurate correlation of data between the tests, and does not constitute a single test within itself against which an accurate evaluation and rating of the subject's hearing can be determined and stated as a composite rating based on all of the tests involved. Thereby, determination of the subjects's hearing condition is not set forth on an overall, comprehensive basis.

There are two basically dissimilar types of hearing loss. These are known as conductive loss and perceptive loss. A conductive loss is usually associated with the capability of the middle ear to conduct sound to the inner ear, so that sounds received at the middle ear are not properly delivered to the sensori-neural elements of the inner ear or the hearing centers beyond that connecting to the brain. The term "perceptive loss" identifies a defect in the capability of a person to discriminate the true quality and intelligence of sound due to failures in the nerve centers of the inner ear and the hearing portion of the brain.

A complete hearing test must comprehensively test the biological organs of hearing, and must also test the mental response of the subject to intelligence transmitted to the hearing center of the brain in a single, unified format, against which an overall evaluation of the subject's hearing may be effected on a scientific basis. It is therefore necessary to test the sensitivity of the ear to various sound pressures, involving complex as well as single frequency sounds, and to determine how this sensitivity varies from the sensitivity of normal hearing. The threshold of hearing for normal hearing has been recognized at from 0 to 15 decibels, and this is established as one reference level in the hearing test of this invention, as far as sensitivity response is concerned.

In addition to the sensitivity test, it is also necessary to determine the subject's ability to translate sound into a meaning of intelligence which is true to the nature of the sound originally transmitted to the subject's ears. If auditory nerves are deteriorated, or if there is deterioration of some mental hearing faculty, the mind will not be able to receive the original sound in its true state, quality and meaning. In the process of transmission the sound will become distorted or parts omitted.

Thus according to the method of the present invention each ear and its associated nerve system is contrasted against the other ear and its system, under conditions in which an original sound intelligence is divided into two portions, neither of which has the full intelligence of the original sound, and one portion is transmitted to each ear, so that each ear hears a portion of the original, and the sum of the portions equals the original. Thus the functioning of the nerve transmission systems is tested by a determination of the degree to which the subject can combine the obscured intelligence of the sound received through each ear to obtain a resultant understanding of the original sound intelligence. It is by this technique that the method of this invention distinguishes between causes of hearing loss. Conductive losses are primarily determined by responses to various sound pressure levels, whereas perceptive losses are primarily determined by ascertainment of the ability to establish the true quality, meaning and intelligence of sound values.

The primary object of my invention is, then, to correct the above defects in the prior art, and more particularly to provide an objective hearing test that will test sensation, frequency and perception at the same time, while testing the coordinated hearing of both ears of a subject, and as well each ear independently of the other.

A further object of my invention is to provide a test based on a single, unified format as involved in a comprehensive method which adheres to a method for the treatment of sound and sound sequences which may test all of the basic functions of the ear and auditory nerve systems as well as adhering to a method of calibration and audio value references which permit the further testing of hearing by compensation of loss as a condition of testing and likewise adheres to a method of evaluating hearing loss as a departure from normal hearing by a scale of measurement and rating which is based on the values of the sounds involved in the testing format and the responses of the subject.

A further object of my invention is to provide an automatic recording and evaluation means for test results or other data.

The above objects will be understood more clearly and further objects will be apparent from the following specification, drawings and appended claims.

Before going into a detailed description of preferred embodiments of the apparatus and method of this invention, it is believed advisable to state a few facts relative to the characteristics of sound and its reception by the ear.

Normal speech is composed of sounds of many different frequencies mixed together, but these are usually in the lower frequency ranges of sound. A person speaking in a normal voice usually emits sounds at a loudness peak averaging about 50 decibels, where 0 decibel corresponds to a pressure level of 0.0002 dyne per square centimeter, although, due to inflections of the voice, some of the speech may be as loud as 70 decibels, and some of it may be as low as 10 to 20 decibels. A person with normal hearing can distinctly understand normal levels of speech at a distance of twenty feet from the speaker, with normal background noise. If, however, he has a hearing defect, he will be able to understand only a portion of the speech or none at all. By the method and apparatus of this invention, this portion is accurately determined, so that an evaluation of the subject's hearing may be accurately determined by the degree of departure from normal hearing.

Sound consists of pressure waves capable of affecting the hearing organ and the auditory nerve system so as to produce the sensation of hearing. Since sound waves spread out in all directions from the source, their intensity, or unit pressure, decreases in power as the distance from the source increases. Thus the ear of a person hearing the speech of another person 20 feet away is not contacted by sound waves equal to the power of the original pressure, but at a much lesser pressure level consistent with the loss in power through propagation. If the hearing person has a hearing loss, so that he cannot understand all or any of the speech from a distance of 20 feet, he must move closer to the source, in order to increase the intensity of the sound *at his ear*. For example, if he were to move to 14 feet from the sound, the sound level or loudness at his ear would be increased by about 3 decibels. According to the present invention, a means and a method are provided by which such an effect can be created, in that once it has been determined that a hearing loss exists, the sound level is increased sufficient to compensate for this loss, and the subject is retested as a check of the amount of hearing loss.

Thus this invention embodies a means and method for testing of the subject's hearing in which the subject's hearing is tested against a compensation for his loss, so that both the cause and degree of the loss may be ascertained. Such a determination allows accurate prescribing of hearing aids and other means for compensating for hearing losses by causing the subject to verify any loss originally established and show the degree at which such a loss may be reversed by compensation by separate ear or both ears.

The method and the apparatus of the invention effect a direct correlation of the biological qualities and capabilities of the ear and the hearing sense to the basic physical properties of sound and the physical laws involved in the propagation of sound. Hearing as an overall faculty is thereby recognized as a combination of a biological capability based directly on a physical phenomenom. It is evident therefore that hearing can only be accurately tested and evaluated by adhering to both the physical laws of sound and the biological capabilities of the ear and the relation of each to the other. This invention recognizes that the subjection of the ear to a test consisting of single frequency sounds can only test in a limited way its overall capability for hearing and recognizing all types of sounds. In this respect, it is to be recognized that single frequency sounds are merely components of complex sounds, such as speech, and that complex sounds are a composite of many frequencies in the same way that white light is a composite of many frequencies of light. Therefore, using the complex sounds of speech as an example, it is to be noted that individual frequencies cannot be isolated.

Hearing tests as previously conducted do not actually test the auditory nerve system and mental faculty, and single frequency sounds do not really test the ability of the subject to identify the sounds used in the test but merely determine whether he has a sensitivity to the particular frequencies and intensities used in the test. For example, if a subject is tested for his ability to hear a 500 cycle tone at 30 decibels loudness, he may respond that he can hear it. This does not mean, however, that his brain recognized this particular tone, but only that he heard something.

By the method of this invention, the subject's ability to identify the intelligence transmitted to him during the test and to respond in terms of what he understood, based upon his overall hearing ability, is determined. The method of this invention does not merely determine the sensitivity of the subject to various frequencies and intensities, although such a determination may be included as a part of the full test.

A person's ability to hear and understand speech is not limited by the fact that he has an impairment of hearing as to certain frequencies at certain intensities. This is amply demonstrated by the fact that many forms of voice reproduction, as in the telephone and in some radio receiving sets, do not reproduce the full range of frequencies of the voice being reproduced, but only a narrow middle range, yet the reproduced voice is still readily understood. Thus the intelligence of speech sounds is maintained even when various frequencies and octaves are filtered out.

The objects and effects of this invention are achieved by a treatment of sound and sound sequences in which the intelligence and meaning of sound sequences and individual sounds of a complex nature are broken up into phonetic components and given to each ear separately in a predetermined manner so that the separate ears and their auditory nerve systems are required to transmit the sound to the hearing faculty and the hearing faculty required to re-assemble the sound parts into the whole of the original sound or sound sequence and thereby recognize the original quality, meaning and intelligence of the whole of the original sound sequence, and test the condition of the auditory systems and hearing faculty. According to this invention, the sensitivity of the hearing organs to complex and single frequency sounds and their ability to perceive the intelligence and meaning of the complex sounds of speech is tested, while, at the same time, the coordinated hearing of both ears functioning as a team on a binaural basis, as well as each ear independently of the other, is tested. Such testing involves the use of a comprehensive, unified format involving sound sequences which may, in a single testing format, test all of the basic functions of the ear and auditory nerve systems. Certain embodiments of the invention involve a method of calibrating the audio values of the test format, which calibration is based upon the fundamental principles governing the propagation of sound as well as the biological capabilities of the hearing faculty to sense and understand such sounds and thereby effect an evaluation of hearing on a basis wherein hearing losses are compensated by a prescribed increase in the calibration reference of the audio values which is relative to the degree of loss ascertained by the test.

In one embodiment of the invention, portions are removed from each sound sequence, so that neither sound sequence is intelligible by itself. If each of the subject's ears function properly for the sound values introduced and if they coordinate properly, then the subject's brain will, so to speak, combine the two series together. By selecting the proper series and synchronizing the transmission of each of the two series with the other, the normal test subject will be enabled to understand the total intelligence, or identifiable significance transmitted, whereas the subject with a defect will hear something less than this. By variations in the characteristics of the sound sequences to each of the two ears during successive responses of the subject, specific defects of either ear, both ears or the coordination of hearing may be identified from objective responses of the subject.

As will become more apparent hereinafter, the subject being tested is incorporated as a part of the hearing test, in that certain predetermined intelligence is transmitted to the subject, and his responses thereto are evaluated with respect to their similarity to responses that would be given by a person with normal hearing. Thus the method utilizes a sound sequence for testing, including instructions, and a fixed standard of responses, all standard to the requirements of normal hearing, and an intermediate variable which is the particular response of the subject being tested, against which a composite method of hearing evaluation is applied.

The principles of my invention may best be explained by reference to the attached drawings in which:

FIG. 1 is a simplified electrical diagram showing one embodiment of apparatus for practicing my method;

FIG. 2 is a plan view of one embodiment of a sound splitting device which functions to break up sound sequence in accordance with my invention;

FIG. 3 is a plan view of the shiftable head recorder employed in an embodiment of my invention, showing particularly the horizontal cam system;

FIG. 4 is a sectional view taken along 4—4 of FIG. 3 and showing the recorder of FIG. 3 and in addition a vertical cam assembly which may be employed with this device;

FIG. 5 is a fragmentary plan view showing the horizontal cam of FIG. 3 when the left cam follower wheel is in the extreme left position and the right cam follower wheel is in its extreme left position;

FIG. 6 is a fragmentary plan view of the horizontal cam of FIG. 3 when the left cam follower wheel is in its extreme left position and the right cam follower wheel is in its extreme right position;

FIG. 7 is a partial sectional view of the recorder of FIG. 3 along line 7—7 of FIG. 3, except that the vertical cam assembly is also shown in place in FIG. 7;

FIG. 10 is a plan view of a modified type of horizontal cam;

FIG. 11 is a schematic representation of a tape magnetized with a shiftable head recorder actuated by a cam of the type shown in FIG. 10;

FIG. 12 is a diagrammatic representation of the recording system which I utilize to edit sound sequences to record suitable testing sequences on magnetic tapes;

FIG. 13 is a diagrammatic representation of a playback system employed in testing hearing according to my invention;

FIG. 15 is a fragmentary vertical section of the device of FIG. 14;

FIG. 16 is a sectional view of the device of FIG. 14 taken along line 16—16 of FIG. 15;

FIG. 18 is a block diagram showing another embodiment of my invention; and

Figure 8:
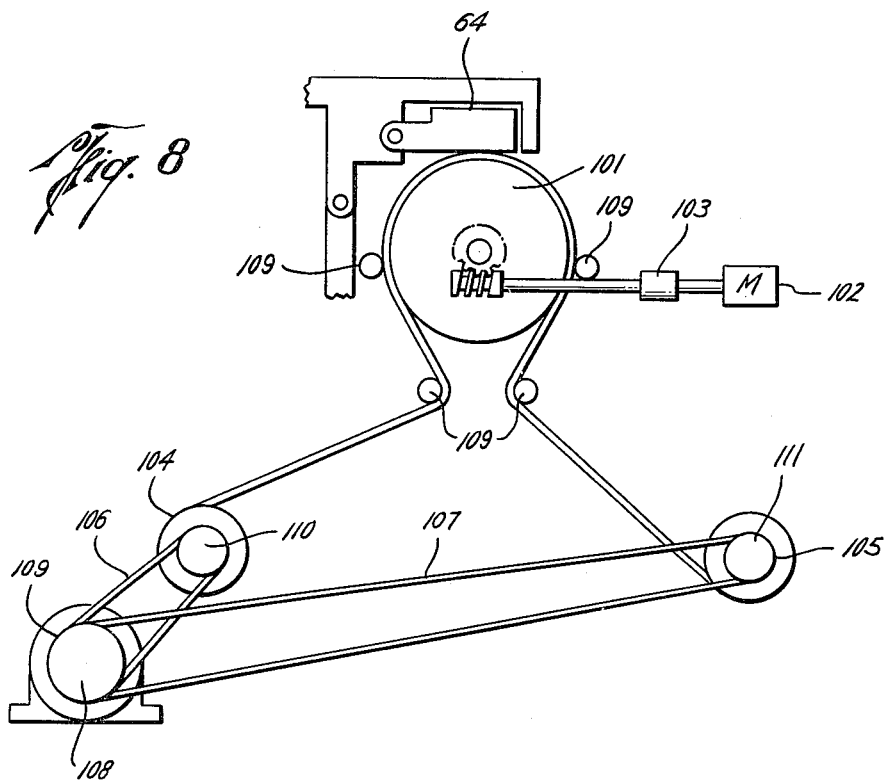
FIG. 8 is a schematic side view representing the tape drive and support assembly.

FIGS. 19, 20, and 21 are sample record cards showing typical responses recorded on apparatus as shown in FIG. 18.

A simple apparatus for practicing my invention is indicated by FIG. 1. The numeral 10 represents any device with a conductible auditory signal output, such as a microphone, a suitable auditory oscillating device, or a reproducible record such as a tape recording or phonograph record of any desired sound sequence and signal pickup means therefor. The output is fed or conducted into the amplifier 12, and the amplified signal is then conducted into the sound splitting machine 13. The sound splitting machine splits the input auditory signal into two separate channels, a portion of the input signal being conducted through the left ear path 14 and then a portion through the right ear path 15, then once again through 14, and once again through 15, and so on in alternative fashion. The present preferred specific embodiment of the sound splitting machine hereinafter described in some detail is actually an editing device employing recording apparatus with shiftable recording heads to make a record in the form of two separate tracks that are laterally displaced on a tape, but it is apparent that the method might actually be practiced by using any switching means which would operate in any desired succession of cycles to close the left circuit and open the right and after a suitable timed interval to close the right and open the left. Although it is not necessary, in practice I prefer to employ switching means so timed as to close both circuits for a short time thereby giving some duplication or overlap of the two output signals. This not only insures that the output signals, when considered together, contain all of the input signal with no skips, but provides a valuable function of testing the ears in a bilateral and a binaural fashion as well as unilaterally.

A type of distributing means or switch suitable to serve as a sound splitting device may be constructed according to FIG. 2, where 21 is a mechanically or electrically driven arm which sweeps 360° above the horizontal axis of its shaft 22. The conducting strips 23 and 24 are out of electrical contact with each other but are connected to the left ear circuit 14 and the right ear circuit 15, respectively. The arm 21 bears down against the strip 23 or 24, or both, depending on its point of location within its 360° cycle. It is obvious from the diagram that the input signal to the distributor arm through wire 27 is conducted out of distributor arm 21 through strip 23 and then out through the left ear circuit 14 when the distributor arm is situated in a portion of its 360° arc adjacent to strip 23. When the distributing arm is in an opposed portion of its arc, the input signal from 27 must flow from 21 into 24 and out through the left ear circuit. During the portion of the distributor's cycle that it is contacting both strips 23 and 24, i.e., the arc locations roughly indicated by 25 and 26 on FIG. 2, it is obvious that the signal from 27 passes from 21 into both 23 and 24 and thence into both left ear and right ear circuits 14 and 15.

The signals from the sound splitting device 13 of FIG. 1 may be amplified as desired for test purposes by suitable amplifiers such as 16 and 17 and then conducted to the left and right ears, respectively, where the signals are reproduced in the form of auditory signals by suitable means such as earphones 18 and 19.

When a recording which has been prepared in this manner is used for testing hearing, the normal test subject with earphones in place will hear a portion of the original input sound through the left ear, a portion through both ears, and then a portion through the right ear, and so on. If the listener has either a left or right ear which is defective with respect to sounds having the characteristics of volume and frequency of the input sound signal, then he is only able to hear part of the transmitted sound, and if the original sound is properly divided, either part alone will be unidentifiable or will not be sufficient for identification of the intelligence or significance of the original sounds. An objective test may be performed on a test subject based on his performance of certain requested identification responses to the sounds he hears. For example, the subject may be asked to write down or otherwise respond to a given series of tones, the requested response being different depending upon the number of tones. The instructions may be varied as desired and, particularly for testing children, may incorporate pictorial or other aids so that responses may require a reference to a picture or object.

As an example of a suitable test, after the instructions have been given as to the response desired, tones of predetermined frequencies may then be introduced through the signal splitting means which divides the input as described above so that a number thereof are heard at least in part by both ears. The subject's response indicates how many tones have been heard which in turn is an indication of his ability to hear both unilaterally; that is, through the left and right ears, individually; bilaterally, that is, through the left and right ears simultaneously for sounds varying in intensity between the two ears; and binaurally, that is, through the left and right ears simultaneously for sounds of the same intensity in each.

Also, words may be broken up by the signal splitting means so that what is heard through one ear only, either left or right, is indistinguishable gibberish, but what is heard through both ears of a normal test subject is distinguishable or conveys the original intelligence of the sound. For example, the word "identifiable" may be broken up as follows: "iden" (left) "ti" (both) "fiab" (right) "ble" (both). If the subject's hearing is good in both ears he will be able to distinguish the word as a rule, especially in a sequence of several words all of which are so divided. Such division of words may be incorporated in the instructions for responses to tests or in various test sequences.

By careful analysis of the broken sounds, from a test, the test designer can analyze the various individual members or components of the sound tones and characteristics thereof going to each ear and catalog each of them as being predominantly vowel or consonant sounds, as the case may be. By utilizing this information to compare against what was missed by a test subject, in an extended test, as one test result it may be determined that the test subject has a hearing deficiency for certain vowel or consonant sounds in either his left or right ear.

I prefer to practice my invention by making a record that may be played back at will in order to test subjects conveniently. Any known recording means adapted to record sound in reproducible form might be used for this purpose; however, I presently employ a magnetic tape recording device. To prepare a tape that embodies the sound-splitting concept, two separate recording tracks are prepared; one for each of the unidentifiable sound series which the identifiable sounds have been suitably divided to produce. Each track contains a record trace comprising the original sound sequence with hiatuses imposed therein at suitably spaced intervals. The division of the sounds by which the tape is made may be accomplished by any suitable means, such as the device pictured in FIG. 2 and previously described. Further, it might be accomplished without the use of a formal switching means by simply preparing a written copy of the words or sounds to be broken up and then editing the scrip to separate it into two separate and essentially unidentifiable series that taken alone have lost their original significance. Thus, the sentence "The man caught the big ball," might be separated into "The . . . caught . . . big . . . ," and ". . . man . . . the . . . ball." A tape track might then be prepared for each series. Though timing would be somewhat difficult it would be possible with practice to arrange the two series in proper time relation to each other for synchronized simultaneous play-back. For example, a recording of the identifiable sounds could be played into earphones and the timing accomplished by recording preselected words of a given series in unison with the corresponding word heard through the earphones, skipping those words of the other series. A second recording could similarly be made of the second unidentifiable series, the recording skipping those words in the first series. By starting the two tracks at the same time on suitable constant speed equipment, the words on the two tracks would fall in proper synchronized time sequence.

Although many other methods might be used, I prefer to make separate recordation tracks on the same tape by using cam operated, shiftable recording heads each adapted to edit an original sound sequence and to provide a playback trace omitting portions of original sequences. Embodiments of my shiftable head recorder, which functions as a sound-splitting means, are shown in FIGS. 3 to 10, inclusive. Referring to FIGS. 3 and 4, the means for shifting the recording heads consists of a horizontal cam 51, a cam drive shaft 52, left and right cam follower carriages 53 and 54, cam follower springs 55 and 56, left and right adjustable retainers 57 and 58, forward and rearward carriage support shafts 59 and 60, left and right recorder head supports 61 and 62, respectively, and left and right recorder heads 63 and 64. The horizontal cam member 51, shown in detail in FIG. 5, consists of segment 70 of arcuate periphery extending from cam body 71, having an arcuate periphery of lesser radius than the segment, at rather sharp transition surfaces 72 and 73.

In operation, as the cam drive shaft rotates the cam in a counterclockwise direction about the shaft axis, the segment 70 strikes the left cam follower contact wheel 74 and the cam follower carriage 53 is forced leftward, as shown in FIG. 5, along the axial direction of shafts 59 and 60, and spring 55 is compressed. As the peripheral transition surface 73 is quite steep, the left cam follower carriage shifts quite rapidly to the extreme left position, and remains there, as it is shown in FIG. 5, until the cam has rotated to the transition surface 72. The cam follower carriage, being under the action of a rightward force from the compressed spring 55, moves rightward as its contact wheel 74 follows the transition surface until the spring regains its normal position and leaves the left cam follower in its extreme right position. Since the cam segment is in excess of 180°, and the left and right cam follower contact wheels 74 and 75 are oriented 180° apart in the horizontal, the cam segment makes contact with the right cam follower wheel 75 and forces it to its extreme right position while the left cam follower carriage is still in its extreme left position, as indicated in FIG. 6. Although it is not critical, I am using a segment of approximately 200° which places the left and right cam followers in their extreme left and right positions, respectively, for approximately 20°, consisting of an overlap for the 10° prior to the motion of the left cam follower to its extreme right position and another overlap for the 10° prior to the motion of the right cam follower to its extreme left position.

As the conventional recording heads are mounted into the recording head mounting frames 61 and 62, which are in turn supported by the cam follower carriages 53 and 54, and constrained to move with them, it is apparent that each recording head reciprocates between an extreme left position and an extreme right position. It is further apparent that the left hand head is in its extreme left position longer than its extreme right position; that the right recording head is in its extreme right position longer than in its extreme left position; and that there is necessarily an overlap when the left head is in its extreme left position and the right head is in its extreme right position corresponding to the overlap for each head's associated cam follower carriage.

I sometimes employ certain auxiliary means to assist in the operation of transferring the magnetic heads; however, the auxiliary means are not required for my preferred embodiment to function properly and efficiently. Referring to FIGS. 4 and 7, the auxiliary means used consist of a camming surface 80 which is essentially a segment of a cylindrical shell with its top mounted flush against the circular plate 82 which is fixed on drive shaft 83, an extension of the cam drive shaft 52. The left and right pickup mounting frames 61 and 62 are mounted on pivots such as 90 which allow rotation in the vertical plane. Horizontal bars 91 and 91a extend outwardly from the left and right mounting frames 61 and 62. On the free ends of bars 91 and 91a auxiliary cam follower wheels 92 and 93, respectively, are pivotally mounted about their axes. The vertical height of the lower surface of circular plate 82 is such that a slight clearance is afforded wheels 92 and 93 when the pickups are resting on the magnetic tape. Cylindrical shell segment 80 is so proportioned that it will intermittently strike wheels 92 and 93 when it is rotated counterclockwise by means of shaft 83. Bevel surface 94, on shell 80, serves as a smooth transition surface for cam wheels 92 and 93 to roll on as it is cammed down by the action of cam shell 80.

When wheels 92 or 93, and thereby arms 91 and 91a, are forced down by the cam shell 80, the head mounting frames 61 and 62 are pivoted about pivot 90 so as to raise then from the surface of the recording drum. As the cam shell 80 rotates out of contact with a particular roller, 92 or 93, the head mounting frames 61 and 62 are gradually returned to the tape surface since the roller 92 or 93, as the case may be, must follow the tapered transition surface 95. In all cases, the spring 93 acts to apply a force downwardly which tends to rotate the support frame and its pivots so that the pickup head will be pushed downwardly against the magnetic tape. The arc segment of cylindrical shell cam 80 is approximately 140°, corresponding to the arc segment of the horizontal cam body 71 and oriented just above it on the shaft so that the lifting action on a given pickup will coincide with that phase of the horizontal cam cycle where the pickup's associated cam follower shell is out of contact with the horizontal cam segment 70.

The magnetic tape is mounted on and manipulated by a suitable constant speed tape drive assembly such as is schematically shown in FIG. 8. The cylindrical rubberized roller 101 is the main drive drum. It is rotated by the main drive motor 102 through gear reduction unit 103. 104 and 105 are tape storage drums or reels. The V-belts 106 and 107 serve to take up slack and keep the tape under constant tension. These belts and the belt contact surface on the sheaves 109, 110 and 111 will slip with respect to each other at a certain belt tension, which value is not critical. I have found that sheave contact surfaces made of Teflon are satisfactory for this purpose. The main drive motor 102 drives the main drive drum clockwise. The friction between the rubber roller and the tape produces a force that pulls unrecorded or unmagnetized tape from the storage drum 104 and over main drive drum 101, on which rides recorder heads 63 and 64. The tape is then pulled on to recorded tape storage drum 105, which is driven counterclockwise by the belt 107 from motor 108. The V-belt 106 to the unrecorded tape drum 104 is also driven counterclockwise, thus providing a braking effect or drag as it slips on drum 104 which is being rotated clockwise by the pull of main drive drum 101 on the tape. Notice that tape from 104 feeds from the top, in contrast to the bottom roll on feed of storage drum 105. The idler rollers 109 are provided to guide the tape path so that the tape is held down in contact with a substantial area of main drive drum 101. This tape drive mechanism functions to maintain a constant tape speed which is highly desirable in order to obtain recordations that can be reproduced exactly.

The horizontal cam system previously discussed is mounted with respect to the tape drive assembly so that the line of reciprocation of the cam follower carriages is at right angles to the direction of motion of the tape. This, of course, places the direction of reciprocation of the recording heads at right angles to tape motion. See FIG. 8.

A tape magnetized according to my invention by the shiftable head assembly described above is represented in FIG. 9. When the left recording head is operating in its extreme left position, the moving tape is magnetized along a line so as to produce the portions or segments 123. When the left head is in its extreme right position, the trace portions or segments 125 are magnetized. The shift of the left head from left to right causes the head to describe paths 124 and the shift from right to left, describes paths 126. When in the extreme right position, the right head magnetizes the trace segments 127. When in the extreme left position, segments 128 are magnetized. The shift of the right head from left to right and from right to left traces paths 129 and 130, respectively. Because the cam segment is in excess of 180°, as previously described, the segments 123 and 127 are longer than segments 125 and 128. When the tape is played back on a suitable dual pickup machine, the left pickup head being set to follow the line of the segments 123 and the right pickup head being set to follow the line of segments 127, the signal produced by both tracks 123 and 127 will, when considered together, substantially reproduce the original sound, before division. If the amplified output of the left pickup is conducted to the left ear and the amplified output of the right pickup conducted to the right ear, the subject with normal ears will be able to ascertain the original significance of the unbroken identifiable sound, or ascertain the intelligence conveyed by it. The human hearing system and brain thus serve as a bridge between the two broken sound tracks.

Although the cam member previously discussed functions in my apparatus to provide magnetized tracks which may be used on play-back to break sound up into unidentifiable sequences according to my invention, I presently employ a somewhat refined embodiment in cam 135 that includes certain preferred features which I believe facilitate the practice of my invention. Referring to FIG. 10, and distinguishing it from FIG. 5, 135 is a cam of my currently preferred design. 135 differs from 70, in that transition surfaces 136 and 137 are shaped differently from transition surfaces 72 and 73. Surfaces 72 and 73 are rather sharp, their design having been prompted primarily to provide simple means to allow cam follower contact wheels 74 and 75 to gain and lose contact with the arc of cam segment 76 and, consequently, shifting the cam follower carriages. On the other hand, cam 135 is designed with a very sharp or steep transition surface 136 and a relatively smooth or gradual transition surface 137. Since the cam 135 is rotating counterclockwise in FIG. 10, the extreme left position for the left cam follower and the extreme right position for the right cam follower carriages are reached as the associated cam follower wheels 74a and 75a, in each case, follow the transition surface 137 to the smooth arc of segment 138. The shift from its extreme left position for the left cam follower carriage to its extreme right position and the shift for the right cam follower carriage from its extreme right position to its extreme left position is accomplished as the associated cam follower wheels follow the sharp transition surface 136 from the arc segment 138 and move inwardly.

Figure 9:
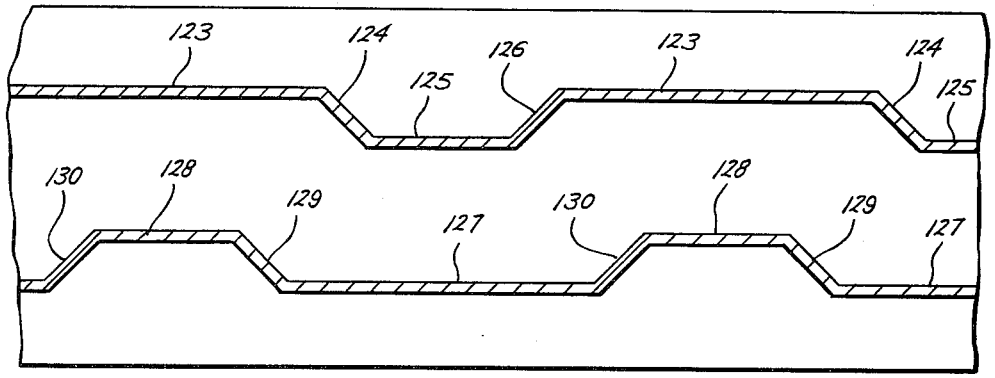
FIG. 9 is a schematic representation of a tape magnetized with the shiftable head recorder of FIG. 3.

Magnetized traces produced by the embodiment employing cam 135 are shown in FIG. 11 in which traces 123a, 125a, 127a, and 128a correspond respectively to traces 123, 125, 127 and 128 in FIG. 9. Traces 124a and 126a, produced by the left recording head, correspond in general with the transition traces 124 and 126 of FIG. 9; however, trace 124a is the sharp or steep trace produced by movement of the recorder head actuated by follower wheel 74a in contact with the sharp transition surface 136 of cam 135. Transition surface 126a differs from 126 in that it is a smooth, gradual transition resulting from transverse recording head movement actuated by the movement of the follower wheel in contact with the gradual transition surface 137 of cam 135 during rotation of the cam. Likewise, the trace produced by the right recording head differs in FIG. 11 in that the transverse angle of transition trace 129a differs from transition trace 129 in that trace 129a is a result of gradual movement of the follower along the surface 137 and transition surface 130a is quite sharp in its transverse angle as a result of the follower 75a follower transition surface 136 of cam 135.

The advantages of this arrangement become evident in considering the play-back of the extreme left track and the extreme right track magnetized on the tape by the left and right recorder heads, which of course move with the left and right cam follower carriages. For example, a pickup placed immediately over the track magnetized by the left head in its extreme left position will, when connected with a suitable amplifying and receiving system, play back that portion of the magnetized tape over which it lies but will not, of course, play back while it is over those unmagnetized portions of the tape where the left head was in the extreme right position. By making the shift from left to right, for the left head, quite rapid, distortion is essentially eliminated and the transition from sound to no sound is sharp. On the other hand, as the tape moves forward under the pickup from an unmagnetized portion to a magnetized portion, the played back sound comes in gradually since the smooth cam 137 causes the recorded track to be shifted from the right to the left gradually. Thus, viewing the path relative to the moving tape of a play-back pickup placed over the extreme left recording position, and comparing it to the line or path followed on the tape by the left recording head as it shifts from its extreme right to its extreme left position, the line traced by the recording head curves in gradually to meet the line of the pickup. As a signal is picked up when a pickup is close to the path of a magnetized trace, and as the strength of that signal increases rapidly as the distance between a pickup and a magnetized trace decreases, it is seen that the sound heard in the play-back of the left track comes in weakly and builds to full level. Thus a comparatively slow sound rise is obtained in place of an instantaneous transition from no noise to essentially full level. Likewise, a play-back of the primary track of the right recording head will result in a sharp transition from sound to no sound and thereafter a gradual build-up of sound. The advantages of the sound rise appear to be twofold. First, because the rising sound is first perceived subconsciously and then as it rises, it gradually passes to the level of conscious perception, the sound shift from one ear to the other is less obvious to the test subject. Secondly, both a bilateral and a binaural hearing test may be obtained by this embodiment. As the subject hears at the full level in his right ear and as the rise begins in his left, for a short time his hearing is bilateral, that is, a sound of one intensity is transmitted to one ear while the same sound, but of lesser intensity, is transmitted to the other. As full strength is reached for the sound level in one ear, then up until the time of the rapid sound fall off in the other ear, the subject's hearing is binaural. Thus, the rise portion of the shiftable head cycle involves a basis for a bilateral test, and the overlapping portion of the cycle where sound reaches both ears with equal intensity, involves a binaural test. It has not been found necessary to utilize the auxiliary cam device discussed above in connection with the cam design 135. Nevertheless, it presently appears that in some applications operations may be somewhat smoother with its use. When used with 135, the cam shell segment is designed to be a few less degrees in arc than the overall arc of the cam follower plus both transitions 135 and 137. The vertical cam shell is positioned with respect to the horizontal cam so that a pickup being lowered through the action of transition surface 137 and the cam contact roller will be lowered gradually onto the tape as transition surface 137 is being followed. This may be employed to improve the resumption of sound by allowing the sound to come in smooothly after each break or hiatus in the recordation track.

To record by means of my shiftable head recorder, I utilize circuitry familiar to those skilled in the art. In FIG. 12, 141 is a microphone which feeds into the amplifying system through preamplifier 142. The output of preamp 142 feeds the driver stage 143 which in turn feeds the amplifier output stage 144. The amplified output is split at junction 145 into signals of equal value, resistances 146 and 147 of the two branches being equal. The shiftable recorder heads in 148 and 149 thus receive equal signals. A grid bias signal is provided by a 31 kilocycle oscillator 150 which feeds through a 31 kilocycle output stage 151 and then through capacitor 152 into the recorder circuit intermittent the amplifier output stage and the junction 6. If I desire to record the signals from an audio-oscillator 160 instead of from the microphone 141, I introduce the audio-oscillator output signal into the circuit intermittent the preamplifier 142 and the driver stage 143, the microphone, of course, being disconnected.

To better understand this embodiment of my invention, it is helpful to consider an example test. A tape having portions magnetized to record sound sequence according to the sound splitting concept is played through the dual pickup play-back machine. One independent circuit amplifies the audio signal from the left pickup and conducts it to the left earphone. The other independent circuit similarly amplifies and conducts to the right earphone from the right pickup. When the device is turned on, the normal subject, with earphones in place, hears through both ears at the same intensity level, that he is to listen and follow instructions. This first portion of the tape is not recorded of course, by use of the shifting heads system, but is prepared by recording the instructions with the shiftable cam device stopped in a position where the left head is at its extreme left position and the right head is at its extreme right position. After the preliminary instructions, from a recording on the left track of the tape there is transmitted through the left earphone to the subject's left ear only, "when you hear the word 'left,' push the green button." Then there is transmitted to his right ear only, "when you hear the word 'right,' press the red button." These portions of the tape were magnetized with the cam system stopped in the proper position; that is, the left ear portion is recorded on the left primary recording track by manually setting, and retaining by any suitable holding means, the cam in position to where the left recorder head is in its extreme left position when the right recorder is either retained in its extreme left position, or lifted or otherwise removed from its primary recording track. The right ear portion is recorded on the right primary recording track by retaining the right recorder head in the extreme right position while the left recorder is also in its extreme right position, or otherwise held off of its primary recording track. Next, if he has normal hearing, the subject hears through both ears instructions to press the appropriate button when the sentence "Press your answer" lights up on the test board. After this, the words "right" and "left" are heard by the subject, some in the right ear only, some in the left ear only, and some divided partly in the left ear and partly in the right, and partly in both at the same time, the divided words being placed on the tape by operation of the shiftable head recorder heretofore described. After each word there is a short pause and then "Press your answer" lights up. At this time the subject indicates his response by pushing the appropriate button if he has understood the instructions and the total import of the sounds transmitted to both ears. The "Press your answer" light and circuitry, which will be described hereinafter, is actuated by a signal which I prefer to record on the same tape as the dual sound track and when so recorded it may readily be properly synchronized with the other tracks thereon.

After the "right" and "left" portion of the test, further instructions are heard by the subject. These instructions are from tracks made with the shiftable head recorder. Thus, for the subject to get the intelligence of the instructions it is necessary that he be able to hear in both ears the sound values. Instructions given are to the effect that certain numbers will be heard and that the subject is to press a number on the test board that corresponds to the numbers given in turn. After each number is spoken slowly or, if desired, spelled out, the "Press your answer" signal lights up and the subject by pressing one of the five buttons indicates that he has heard and understood the instructions and the number which may range from one to five. The entire numbers portion of the test is presently recorded with the shiftable head recorder.

Next, additional instructions are transmitted to both ears to state that the subject is to indicae how many electronic tones he hears by pushing the button with the number corresponding to the number of tones heard. Various series of sounds of predetermined frequency characteristics may then be used. I prefer to use sounds of constant frequencies between 500 and 4000 cycles for each sequence. These sound sequences are given some in the left ear only, some in the right ear only, and some in both ears. After each series or sequence, the "Press your answer" signal lights up and subject indicates his response by pressing the number corresponding to the number of tones he heard.

It is necessary that the "Press your answer" signal during the test which was described in the test above, be synchronized properly with the test sound sequences. This may be accomplished by various means, one of which is to record a signal to activate a "Press your answer" circuit on the same tape that the audio left and audio right tracks are recorded. To accomplish this, a signal is conducted from a suitable oscillation, such as audio-oscillator 155 to amplifier 156 and the output is conducted to recorder head 157 which is mounted to record signals on the tape of the shiftable head recorder upon a track spaced laterally from the dual primary recording tracks for test sound sequences. Also included in this circuit is a circuit closing button 158. To use this "Press your answer" recording circuit in conjunction with the left and right audio track recording circuits previously discussed, it is necessary to prepare a time schedule of the materials to be recorded in advance. By allowing a suitable length of time for "Press your answer," for example, 5 seconds, the overall time for the test may be approximated. Then to record, the recorder speaks each individual portion of the test through the microphone, and after he is through with a given portion, he presses the "Press your answer" recording circuit button 158 and that circuit is energized to allow recording head 157 to magnetize a small track on the tape. The time interval from when the "Press your answer" button is depressed until the recorder should start speaking again may be timed by a stop watch or similar timing device. Although it is necessary in this embodiment to allow the tape to run for the length of time the "Press your answer" light is to be active, it is not necessary that a magnetized track be laid this full length of the tape, as will later be explained.

I also record another signal on the tape to be used in activating a motor or rotary solenoid to advance a card on which the test subject's responses are recorded. This circuit may be quite similar to the "Press your answer" recording circuit described above, consisting of an oscillator 160 and an amplifier 161, a circuit closing button 162, and a recorder head 163, which is positioned to record on the same tape as the audio left primary track, audio right primary track and "Press your answer" signal track and in laterally spaced relation with respect to said recordation tracks. The proper time of activation for the card motor advance occurs just after the audio shuts off and before the "Press your answer" light is lit. The proper timing may be programmed in advance as described above for "Press your answer," and the signals may be recorded by simply depressing button 162 at the appropriate times.

The play-back device that I presently use to test subjects in accordance with this embodiment of my invention employs two pickup heads and amplifying circuits, one for the audio left or left ear circuit and the other for the audio right or right ear circuit. These pickup heads are positioned to pick up the recordation traces on the primary left and right recording tracks. Two additional pickups and circuits are provided for the "Press your answer" signal and the card motor advance signal which activates the "Press your answer" circuit and the card motor circuit, respectively. The tape drive and support device for use with the magnetic pickup heads may suitably be of the same type and arrangement as that shown in FIG. 8 and described in connection with shiftable head recorder. Referring to FIG. 13, the play-back device utilizes four separate pickups: an audio pickup 213 for the left ear circuit 214, an audio pickup 215 for the right ear circuit 216, a pickup 217 for the "Press your answer" light and button circuit 218 and a pickup 219 for the card motor circuit 220. The left audio circuit 214 and the right audio circuit 216 include analogous components. The left audio signal is transmitted from the tape by pickup 213, and conducted to the left earphone 223. The right audio signal is transmitted from the tape by pickup 215, amplified by preamplifier 224 and cathode follower 225 and conducted to the right earphone 226. To play a tape, it is caused to move at a constant rate by activating tape drive mechanism and the pickup heads 213 and 215 are mounted in fixed position so as to be directly over the paths of the two primary tracks, illustrated as the extreme left and extreme right tape tracks, 123 and 127 heretofore described and shown in FIGS. 9 and 11. The pickups 217 and 219 are positioned over the "Press your answer" and card motor tracks. In play-back, the left ear will hear only those sounds recorded while the left recording head 63 was in its extreme left position and the right ear will hear only those sounds recorded while the right recording head 64 was in its extreme right position.

Although the magnetic tape I have described is a very satisfactory record receiving member, any of a number of types of record receiving members with appropriate recording and play-back means might be employed in the practice of my invention and the dual [primary] tracks described above may be recorded along any retraceable paths such as the spiral recordings upon disc records. Phonograph records and recording and play-back means might be employed, for example, as well as wire recordings employing two wires, sound track recordings upon a photographic film and other means of recording sound so that it may be reproduced.

The "Press your answer" circuit 218 utilizes an audio signal, recorded on the test tape or other record receiving member as previously described, to activate the "Press your answer" light 227 and energize the circuits of the card punch solenoids 228. The "Press your answer" signal is picked up by pickup 217, amplified by a preamplifier 229 and cathode follower 230 and conducted through a relay 231 to ground. To prevent the relay from chattering a capacitor 231a may be employed in parallel with the solenoid circuit of the relay 231. The energized relay 231 closes and energizes the circuit which in turn closes relay 232. After relay 231 opens the variable resistor 233 and the capacitor 234 cooperate to maintain sufficient current to keep relay 232 closed for a short time. The length of time that relay 232 remains closed in response to an amplified signal from pickup 217 may be varied by adjusting variable resistor 233. The time delay provided by this means eliminates the need for timing the recording of the signal track for this circuit. It is purely a matter of choice, but 1¼ seconds is a representative time for energizing the "Press your answer" circuit and is ample to allow the test subject to indicate his response. While relay 232 is closed, the "Press your answer" light 227 operates. In addition, the five card punch solenoid 228 may be operated by pressing the seven buttons on the test board to close their circuits. The five solenoids are wired in five parallel circuits: one circuit contains a solenoid 228 in series with the parallel arrangement of the "left" button 235 and the "one" button 236; one circuit contains a solenoid 228 in series with a parallel arrangement of the "right" button 237 and the "two" button 238; and each of the other three parallel circuits contains a solenoid in series with one of the buttons 239, 240 and 241, which are the "three," "four," and "five" buttons, respectively.

The card motor circuit 220 energizes card motor 242, which is strictly speaking a rotary solenoid, which rotates through 30° and advances the record card in response to activation, as will be described in more detail in a later paragraph. The signal in circuit 220 is energized as a result of a pickup of a recorded signal by magnetic pickup 219, which signal is amplified through preamplifier 243 and cathode follower 244. The amplified signal closes relay 245, which is followed by the closing of relay 246. Capacitator 246a is in parallel with the solenoid coil of relay 245 in order to prevent relay 245 from chattering. While 246 is closed, current flows through rotary solenoid 242, which I also refer to as my card motor. Although the circuit as shown provides for a current of short duration, this is sufficient to operate a rotary solenoid such as Ledex No. HD–55–R–25–26–X3–X9–X8, which I employ.

Figure 14:
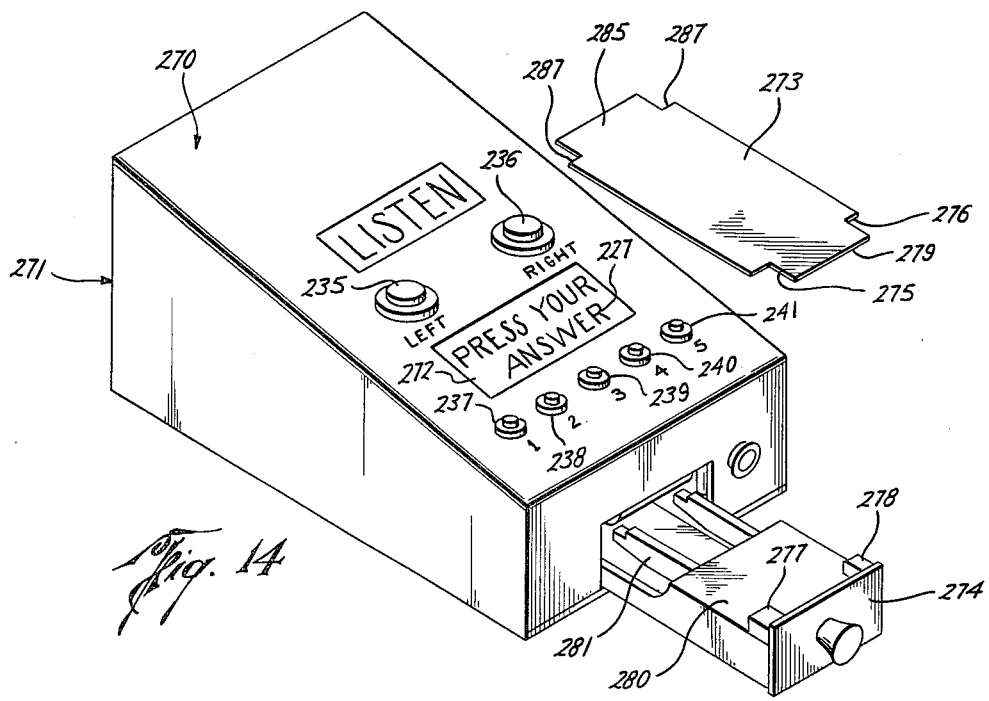
FIG. 14 is a perspective view of a cabinet housing sound sequence transmission equipment and a test response recording system.
Figure 17:
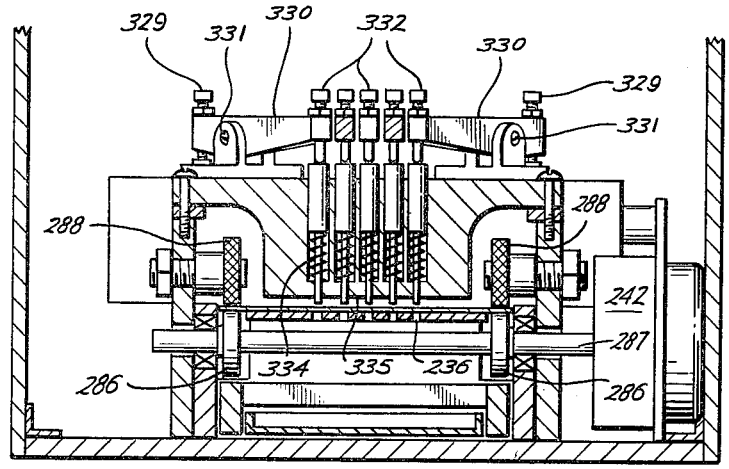
FIG. 17 is a sectional view of the device of FIG. 14 taken along line 17—17 of FIG. 16.

Referring now to FIGS. 14 through 17, those figures illustrate an embodiment of test card mechanism and punching means which may be suitably employed to record hearing test results or any desired information as well as hearing test results. As a matter of convenience, I mount the buttons 235, 236, 237, 238, 239, 240 and 241 on the top panel 270 of cabinet 271 as shown in FIG. 14. The "Press your answer" light 227, not visible in FIG. 14, is also mounted therein under the cut-out letters "Press your answer" in cover plate 272. With further reference to FIGS. 15, 16 and 17, cabinet 271 contains a rotary solenoid 242 and the five solenoids 228, previously mentioned. A record card such as 273 is inserted in drawer 274 so that the notch portions 275 and 276 fit against the edges of drawer lugs 277 and 278, respectively, and the card tongue 279 lies between them. The notch portions are configured to cooperate with drawer lugs so that the card may only be inserted in one way. The card rests flat on plate 280 and on runners 281 which are vertically flush with plate 280. When the drawer 274 is closed, card 273, in place as described, is guided in horizontal travel by a lip 282 which keeps the card from turning upwardly and lip 283, which is turned downwardly between support rails 281 so as to guide the card on the top of plate 284 which is a horizontal extension of lip 283.

When the drawer closes, the forward tongue 285 of card 273 extends past rubber card drive wheels 286 and the card shoulders 287 are pushed against card drive wheels 286 and knurled card idler wheels 288, their clearance being insufficient to permit the passage of the card prior to actuation of the rotary solenoid 242. To facilitate initial feed of the card 273 between the card drive wheels 286 and the card idler wheels 288, I use a card length slightly in excess of the distances between the location where the front shoulders of the card strike the wheels to where the edge of the tongue 279 strikes the interior of the face of the drawer 274. This produces a small curvature in the card as represented by 289, which in turn produces a small force which tends to push the card between the rollers.

When the rotary solenoid, which I refer to as the card motor, is operated through circuit 220, as described above, the card drive wheels 286, being secured on shaft 287, rotate counterclockwise, as viewed in FIG. 15, and pull the card leftward between the card wheels 286 and the idler wheels 288, which are forced into clockwise rotation by friction with the card. Each time the rotary solenoid shaft 287 makes a 30° rotation in response to a signal, the card is fed forward a predetermined constant distance, depending on the diameter of the card wheels 286. Each such movement of the test card aligns successive punching positions thereon with the five punches previously described. After the card motor has operated and a "Press your answer" signal activates circuit 218, the test subject indicates his answers, if any, in the illustrated embodiment by pressing one of the buttons 235, 236, 237, 238, 239, 240 or 241, each of which energizes a separate punch solenoid and the selection of each such button is indicated by the punch location within said punching position.

The particular solenoid 228 in series with the selected button pressed is energized as described above. Many solenoids would be appropriate such as Ledex No. BD–5 which I presently employ for this purpose. The energized solenoid 228 forces striker 328 upwardly, which in turn drives pin 329 upwardly and causes link 330 to pivot about support 331 and drive pin 332 downwardly. Pin 332 in turn drives punch anvil 333 downwardly against the action of spring 334. The punch member 35, being integral with the anvil 333, is driven through the card 273 and into the card punch receiver hole 336 in plate 284 corresponding to that particular punch. In order to facilitate punching, the punch point 335a may be beveled to present a sharp edge toward the card. There being a small clearance between the end of punch point 335 and the surface of the card 273, the punching is facilitated by the resulting inertia effects of the punch point traveling this short distance before striking the card. The punched portion of the card is driven on through 336 and falls into a suitable receptacle drawer, indicated generally as 337, where it may be removed with other card punch waste periodically. After the solenoid completes its stroke, the spring 334, which rests on the bottom of punch support block and spring retainer 338, resumes its normal position to force anvil 333 and 332 upwardly and pivot lever 330 about pivot 331 to return it to rest in its normal inactive position, whence the cycle began. The lever will remain in this position until the circuit is again activated by a button being depressed while the "Press your answer" light is on.

It will be apparent that other test recording means of differing types might be employed in the practice of my invention and, moreover, that the punching means I have described could be replaced by other conventional punching means such as, for example, mechanical linkages utilizing the subject's pressing of the buttons to move the punch or the use of a rotating motor means as a power source for cam operated punches.

As a matter of convenience, the cabinet of FIG. 14 includes jack plug receptacles 410 that the left and right earphones 223 and 226 may be plugged in when desired.

By using the play-back device, including the automatic card punch, it is evident that a record may be obtained on a test card showing the test subject's objective response to each portion of the test. That record will appear as a series of holes spaced at given intervals corresponding to the punch locations relative to the test card and in one of five rows parallel to the driven direction of the card. By comparing this card to a key card which has been properly punched to indicate the normal response by one with good hearing, the mistakes made may be readily picked out and the card may be kept as a record, if desired.

In order to facilitate multiple tests, I have found it convenient to employ several of the test cabinets of the type illustrated in FIGS. 14, 15, 16 and 17, with a single play-back device. Thus, the test cabinets would be arranged in parallel, each being connected to the amplified outputs of each of the pickups 213, 215, 217 and 219.

In another embodiment of this invention, a means and method are provided in which the subject is automatically incorporated into the hearing test, and in which his hearing capability is automatically evaluated with respect to the hearing capability of a person with normal hearing. Means are provided by which the hearing loss as determined by the test can be precisely compensated for, so that an additional verification test is given under conditions which allow a test subject with a conductive loss to hear as much as does a person with normal hearing. Thus the type and extent of hearing loss are readily ascertained, and hearing correction devices are accurately prescribed.

In this embodiment, a sound sequence which makes use of a wide range of sounds is transmitted to the subject, parts of the sound sequence being transmitted to both ears, parts to one ear, and parts being of the split-sound type hereinbefore described. A first unit of the apparatus provides this sound sequence, and also provides coordinating signals to a second, push-button unit, and to a third, computer unit. The subject's responses tabulated on the push-button unit are conveyed to the computer unit, where they are compared with the original sound sequence and are stored until the end of the test, when the computer unit computes the result of the test and marks a record card.

The simplified block diagram in FIG. 18 shows preferred means for practicing this embodiment of the method of this invention. A magnetic tape 514, prepared by the means and method hereinbefore described, has recorded tracks 518 and 519. Each such recorded track constitutes a recorded sound sequence, and, in this embodiment, also includes certain signal impulses used for actuating various components of the apparatus.

Two pickup heads 516, 517 are provided, each to pick up the intelligence, or sound sequence, recorded on one of the tracks 518, 519 on tape 514. These sound sequences are then transmitted through filters 520, 521, respectively, and adjustable amplifiers 522, 523, respectively, to left and right earphones 524, 525, respectively. Filters 520, 521 function to separate signal impulses to operate other apparatus, as is hereinafter described.

In a preferred method of use of this apparatus, the test subject is given instructions, through the earphones, to press certain of the buttons, L, R, 1, 2, 3, 4, and 5 on push-button panel 526. A signal impulse, as from filter 520, causes a "Press your answer" panel to light up on the push-button panel when it is time for the test subject to respond to the instruction.

Master stepper switch 527 is programmed with a plurality of circuits, including one for each response the test subject is supposed to make throughout the hearing test. An impulse from filter 521, fed through a conductor 530, causes the master stepper to step from one circuit to the next, in keeping with the test sequence.

When "Press your answer" lights up, a test subject who has understood the instruction presses the proper push-button, as he was instructed. Pressing the proper push-button closes the corresponding circuit in the master stepper, causing a signal to be fed to either the left memory stepper switch 531 or the right memory stepper switch 532, depending on which ear the instruction was given to. This signal causes the memory stepper switch to move to the next step, thus recording a proper response to the instruction. If a wrong response is given, the circuit in the master stepper will not be closed, so that no signal is fed to one of the memory stepper switches, so that the test subject receives no credit.

After the test subject responds, a signal from filter 521 advances the master stepper to the next step, in readiness for the next instruction to be given the test subject, so that the master stepper can compare the test subject's response with the instruction given the test subject.

Upon completion of all instructions to the test subject, and upon his response to these instructions, a signal from filter 521 is fed to the marker stepper 535. This signal causes marker stepper 535 to operate the card advance and return device 536 to advance a record card 537 to a position corresponding to the positions of the left and right memory steppers, and to operate marker 538 to punch appropriate holes in record card 537 to indicate the total response of the test subject, and therefore indicate the hearing ability of both his ears.

Pure tone signals recorded on the tape are utilized similarly as in the embodiment of the invention shown in FIGS. 1 to 17. The responses of the test subject are compared in the master stepper, and a correct response is signalled to the left or right memory stepper. By means of a signal through filter 521, this response is picked up immediately by marker stepper 535, which causes an appropriate indication to be made on record card 537.

This provides a means for a separate determination of the test subject's ability to hear various frequencies at various intensities, while incorporating these responses into the overall test response to assist in the determination of his overall hearing ability.

For a complete testing of the hearing capacity of a test subject a series of instructions are given to the test subject, similarly as has been described hereinbefore with reference to the embodiment of FIGS. 1 to 17. A test series which has been found to be a particularly good test begins with binaural instructions to the subject to press the "L" or "R" button when he hears the words "left" or "right." The words "left" and "right" are then given several times in random order, some to one ear and some to the other. Then these words are repeated several times, each word being split so that part of each word goes to the left ear and part to the right ear.

A test subject is then instructed, in instructions which are split between his ears, to press buttons 1 to 5 according to the number he hears. The numbers "1," "2," "3," "4," and "5" are then spelled, in random order, part of the spelling of each number being fed to one ear and part to the other.

The test subject is then given a pure tone test, in which he is instructed to press a button corresponding to the number of tones of a predetermined frequency he hears. Some of these tones are fed to his left ear and some to his right ear.

As the test subject responds to each instruction, he is given credit for correct responses in the left and right memory steppers, and depending on the total number of responses as related to particular values of the sound sequences in each part of the test, the hearing of the subject is evaluated by ear and the steppers cause a printed card in the form of a hearing report to be punched at the precise point on the card indicating the degree of the subject's hearing as referenced to the particular levels of the test involved.

The subject is given only a very short time for each response, preferably between about one and two seconds, so that he will respond automatically to the instruction, and will not have time to think about his response or to make guesses. This short response period method eliminates the possibility of guessing or conscious attempts to falsify a response.

The method involves a specific technique of calibrating the sensitivity level of the overall test to fulfill and simulate a condition which is equal to the average intensity level of the voice speaking at a normal level after it has traveled a distance of 20 feet (240 inches) and at that point is one inch from the ear, and at this point is delivering to the ear an average intensity level of fifteen decibels for the speech sounds thereby involved, so that the hearing ear is tested for the ability to respond to a sensitivity level consistent with normal hearing. Simulation of this condition in electrical values and audio output requires a specific method of calibration for the purpose of simulating this condition which is involved as a fundamental of the method of this invention. In accordance with this, the overall testing format and all of its sound sequences and values is calibrated by electrical references based against an audio output value corresponding to 1000 cycles at 50 decibels (using 0.0002 dyne as a point of reference) for the peak power value of the sound sequence for electrical calibration only. This audio reference for electrical calibration in function and in practice thereby creates an average intensity value for the test which corresponds to and simulates the conditions of intensity as they may exist with the modulating speaking voice traveling a distance of 20 feet, or 240 inches, to within one inch of the ear. Correspondingly, this likewise adheres to the threshold sensitivity requirements for normal hearing of from zero to 15 decibels.

If the test subject hears substantially all these spoken instructions and response sounds, his responds will so indicate, and the memory steppers will advance accordingly. If, however, he is able to hear only a portion of the intelligence transmitted to one ear, he will be unable to properly respond, so that the memory stepper for that ear will advance only to the point which corresponds to the portion the subject has heard. It is evident, in such a case, that he has been unable to hear the low-intensity intelligence, or to assimilate the broken components of speech to the proper meaning of intelligence.

The first test given a test subject is given with the adjustable amplifiers set to provide a sound intensity equivalent to a normal speaking voice 20 feet away. The sound intensity may be increased for later tests by adjusting the amplification. Adjustments may be made to any one of fourteen different amplifications which are 3 decibels apart in accordance with a mandatory scale of the required percentage gain in pressure corresponding to the actual gain in pressure to the ear when the speaking voice is advanced nearer to the subject and the subject is receiving a sufficient gain in pressure consistent with the biological capability of the ear to recognize and respond to an increase in pressure value. Three decibels was selected as the minimum increment because the human ear is incapable of detecting loudness variations of much less than 3 decibels on a free field, non-comparative basis.

An increase in the calibration reference output of the amplifiers from 50 to 53 decibels is the equivalent of moving the speaker in from 20 feet away to 14 feet away. This is apparent from the fact that the intensity or pressure level of sound varies inversely as the square of the distance from the source, and the loudness in decibels is a direct function of the logarithm of the intensity. Further calculation will show that increasing the sound level by 3 decibel increments will have the effect of moving the sound source to fourteen different positions from 20 feet away to one inch away. These distances are set forth in the column headed "Perimeter" on the left side of the record card shown in FIG. 19.

If the subject fails to properly respond to a significant portion of the instructions given to one ear, the memory stepper for that ear will not advance as far, and the marker stepper will cause the marker to mark an indication on the record card that the subject has a hearing loss.

Reference is now made to the three hearing report cards shown in FIGS. 19, 20 and 21. The second column from the left at the top of the card lists the various perimeters at which the hearing test may be given, and the first and third columns provide space for recording the perimeter at which the test is given to each ear of the test subject. The fifth column lists the percentage hearing losses that may be shown by the test, and the fourth and sixth columns provide space for recording the percentage loss found by the test for the left and right ears respectively. With the use of an accurately devised sound sequence, this percentage loss also indicates the hearing perimeter of each ear, or the intensity gain at which the sound sequence must be transmitted to the ear in order for the hearing loss to be compensated. The seventh column indicates the percentage gain in social adequancy that is believed to be attained by a particular change in perimeter. The eighth column is an indication of the threshold level of the test, as well as of the hearing of the test subject, which has been found to be a function of the percentage loss determined by the test.

The hearing loss for each ear is recorded in terms of the sound pressure level that has been found to be required for the defective ear to fully respond to the instructions transmitted to it, or in terms of the corresponding distance from which normal speech level must be heard by the defective ear in order to achieve full response. The relationship between the number of responses, the hearing loss percentage, and the required amplification is believed to be logarithmic. These correlations are believed to be due to the wide range of intensities used in the original sound sequence, and to the fact that there is a logarithmic relationship between intensity and ability to hear. However, due to the many variables involved in hearing loss, as hereinbefore set forth, these correlations may not always be exact, but merely approximate. This also holds true for the social adequacy gain indication and the threshold level determination.

In the sample shown in FIG. 19, the subject recorded sufficient correct response to the testing format to his right ear to establish normal hearing, as shown by mark 540, but recorded an insufficient number of correct responses to the instructions to his left ear, as shown by mark 541. Thus it is indicated that, of the wide range of mixed frequencies and varying intensities involved in the test, the subject's left ear was unable to identify a large portion, equivalent to a 30% loss in the left ear. However, the record card indicates that if the subject's hearing loss is purely conductive, and if the pressure level were increased so as to be equivalent to that received from a normal speaking voice four feet away, the left ear should be able to hear and identify all the intelligence transmitted to it.

It may therefore be said that this defective ear has a hearing perimeter of four feet, based on a twenty feet perimeter standard for normal hearing. In other words, this ear would have relatively normal hearing within a distance of four feet.

Thus a check of the results of the first test may be made by, in effect, moving the source of sound feeding the defective ear to the point necessary to compensate for the loss. This is actually accomplished by merely increasing the sound intensity until the pressure level at the ear is the same as though the sound source were moved closer an equivalent distance.

By this means, the subject is placed in the position of establishing whether his loss can be alleviated by medical or artificial means, and the degree to which it can be alleviated. As will be seen, this method serves to determine whether the loss is conductive or perceptive, or possibly a combination of the two. If, for example, the subject whose left ear shows a loss as is indicated by the record card of FIG. 19, has a purely conductive loss, a second test in which the sound pressure level for the left ear is increased to a level corresponding to the four foot perimeter should give the results shown on the record card in FIG. 20. It is noted that this card shows that the subject was able to hear and understand substantially all the intelligence transmitted to each of his ears.

If, however, the subject has a perspective loss, or a combination of a conductive and perceptive loss, the mere increase in intensity or sound level to the perimeter indicated by the first test may not completely alleviate his loss. The report card shown in FIG. 21 indicates a combination of a conductive and a perceptive loss, wherein the mere increase in sound pressure level did not result in full understanding by the subject through his left ear, although he was able to identify more of the intelligence transmitted to this ear at the increased sound pressure level than at the pressure level corresponding to the twenty foot perimeter of the initial test. Furthermore, the record card of FIG. 21 indicates a less accurate response to the instructions to the right ear. This indicates that the increased intensity to the left ear probably decreased the discrimination of both ears so as to aggravate a perceptive loss to the extent that such a loss shows up as a defect to the overall hearing capacity.

The second, compensating test also provides a means for detecting malingerers, who attempts to claim a hearing loss when they actually have no loss. A subject who tries to falsely indicate what he hears is effectively exposed, since he will be unable to coordinate his falsification with the changes in sound level. Such a result is of great importance in detecting spurious claims for loss of hearing due to accidents, for example.

The "Audiograph" portion of the record cards records the subject's response to the pure tone portion of the test.

A perfect response to this portion of the test is indicated by the markings on the Audiograph portion of the record card in FIG. 20. Note that on the FIG. 19 record card the subject indicated that he heard all the right ear tones, but was unable to hear all the left ear tones. Upon increasing the intensity of the sounds transmitted to the left ear, the subject is able to hear all the left ear tones, as indicated on the FIG. 20 card. Furthermore, no overall hearing loss is indicated, thus showing that a mere increase in intensity corrects the hearing defect. Such a defect is indicated as wholly conductive. Note that the record card in FIG. 21 also indicates a perfect response to this pure tone portion of the test but still indicates an overall hearing loss, not only in the left ear, which has been compensated, but in the right ear, which according to the first test apparently had no hearing loss. Such an apparent enigma is explained by the fact that the subject has a perceptive hearing loss in addition to a conductive loss. This conclusion is reached because an increase in sound intensity allowed the subject to receive a sensation from all the pure tone signals, which are transmitted to each ear independently, but did not give him understanding of the spoken instructions, many of which were split-sound instructions. As shown by the record card, the increase in intensity helped the overall understanding of the left ear, but actually hindered the overall understanding of the right ear.

It is evident that the pure tone test alone would not have revealed such a perceptive loss. The pure tone test showed only that an increase in intensity would allow the subject to receive some sensation from the pure tones. This does not mean that he actually recognized the tone, or that he could identify it, but only that he was conscious that there was a tone. The method of this invention, however, results in a determination of whether the subject is only conscious of a sound or whether he actually hears and can identify the sound. Thus this method reveals both the type of loss and the extent of the loss. Such a revelation is invaluable in the treatment of and compensation for such losses. Previously, only trial and error methods were known for determining the type and extent of hearing loss, while the method of this invention provides an accurate identification within a few minutes' time.

One of the major advantages of the hearing testing method of this invention is that it can be conducted under conditions of ambient noise, so that a soundproof room is not necessary. This is made possible by the fact that this method does not involve a determination of the minimum level of hearing acuity, but instead it involves a determination of the subject's ability to understand normal speech under conditions under which speech is normally heard, as compared to the ability of a person with normal hearing to understand such speech. It will be appreciated that a test conducted with no background noise is not a test of the subject's overall hearing ability, since one of the characteristics of good hearing is the ability to discriminate, so that one can pick out from the background or ambient noise the particular sound he wishes to hear and can identify and understand this particular sound. A deficiency in this ability to discriminate is determined by the testing method of this invention, although such a deficiency clearly cannot be ascertained in the usual minimum hearing acuity test.

Whereas acoustic values are calibrated against 1000 cycles at 50 decibels as the basic reference of peak audio output at a 20-foot distance against which the evaluation formula and the fixing of perimeter values are also established, the recording and output in audio value of the testing format may be adjusted above or below this basic peak reference in accordance with requirements of the various elements of the testing format.

Although the apparatus and method of this invention has been described principally in their application to hearing testing, it will be apparent to those skilled in the art that it can also be applied to other types of testing of test subjects capable of making a response to sensory impulses, wherein intelligence is transmitted to the test subject, and his response to this intelligence is compared to a standard, or is evaluated so as to provide a psychological analysis of the subject's proclivity to respond to the intelligence and meaning of various sensory impulses under certain conditions. Thus visual intelligence may be combined with audio intelligence in a test to determine whether a subject can respond according to a norm. The visual intelligence may be used to complement the audio intelligence, similarly as in the sound-splitting procedure of the hearing test, or the visual intelligence may be used as a contrasting, or intelligence obscuring means, with the purpose being to determine whether the test subject can respond to audio intelligence when he is being diverted by visual intelligence, or vice versa.

Thus although the method and apparatus of this invention are particularly well adapted to hearing testing, they may also be used in the testing of other senses, and in making determinations of a person's intelligence, aptitude and personality. It may therefore be said that the invention includes a method in which a human sense capable of responding to intelligence is subjected to such intelligence, the intelligence being divided into parts, each part of which has obscurity of the original meaning, and the separate parts being transmitted to separate organs or components of the sense, or to different senses.

From the foregoing, it will be seen that this invention is one well adapted to attain all the ends and objects hereinabove set forth, together with other advantages which are obvious and which are inherent in the method and apparatus.

It will be understood that certain features and subcombinations of my invention are of utility and may be employed without reference to other features and subcombinations and this is contemplated by and within the scope of the claims. Moreover, many possible embodiments may be made of my invention without departing from the scope thereof and various changes in size, shape and materials as well as details of the illustrated embodiments may be made without departing from the spirit of the invention. I therefore contemplate by the appended claims to cover any such changes and modifications as fall within the true spirit and scope of my invention.

What I claim as new and desire to secure by Letters Patent is:

1. A method of testing the hearing of a test subject comprising the steps of: separating a sound sequence of identifiable significance and desired testing characteristics into two modified sound sequences having hiatuses obscuring the significance of the original sound sequence, and simultaneously transmitting one of said modified sound sequences to only one ear of a test subject and the other modified sound sequence to only the other ear of the test subject.

2. A method of testing hearing comprising producing an original sound sequence having predetermined characteristics of frequencies and volumes as desired for testing hearing and having an identifiable significance in its entirety, recording said original sound sequence, reproducing simultaneously from said original sound sequence first and second modified sound sequences each of which comprise a portion of the original sound sequence but with sufficient portions removed therefrom to obscure the original identifiable significance, and transmitting in proper time phase one of said modified sound sequences to only one ear of a test subject and the other modified sound sequence to only the other ear of said test subject.

3. An acoustical apparatus for testing the hearing of a subject intellectually capable of identifying sounds having a predetermined identifiable significance comprising, means for producing an original sound sequence having such predetermined identifiable significance in its entirety, means for simultaneously producing from said original sound sequence first and second sound sequences identical to said original sound sequence, interrupter means to modify each said first and second sound sequence to produce first and second modified sound sequences each of which comprises the original sound sequence with portions removed therefrom to provide imposed hiatuses tending to obscure the original identifiable significance in each of said first and second modified sound sequences, said interrupter means being adapted and arranged to provide such imposed hiatuses in each said first and second modified sound sequences with said hiatuses of each sequence being disposed to avoid coincidence with hiatuses of the other modified sound sequence whereby when said first and second modified sound sequences are produced simultaneously no part of any imposed hiatus in one of said first and second modified sound sequences will coincide in point of time with any part of an imposed hiatus in the other sound sequence, means for simultaneously transmitting said first modified sound sequence to one ear of said test subject and said second modified sound sequence to the other ear of said subject.

4. An acoustical apparatus for testing the hearing of a human subject comprising a means for producing an original sound sequence having a predetermined identifiable character in its entirety, means for producing first and second modified sound sequences, said first and second modified sound sequences comprising the original sound sequence with portions removed therefrom to provide imposed hiatuses to obscure the original identifiable character of each said first and second modified sequences, said modified sequences having imposed hiatuses disposed at intervals so as to avoid coincidence of any hiatus of one of said modified sound sequences with any part of any imposed hiatus in the other modified sound sequence, and means for simultaneously transmitting said first modified sound sequence to only one ear of a hearing test subject and transmitting said second modified sound sequence to only the other ear of said subject.

5. An apparatus as set forth in claim 4 in which the means for producing the first and second modified sound sequences are further characterized in that said means impose hiatuses so as to provide an interval of time between the end of each imposed hiatus in each one of said sound sequences and the next succeeding hiatus provided in the alternate sound sequence when the two are reproduced simultaneously.

6. Apparatus for testing the hearing of a test subject capable of making an identification response to an original sound sequence having an identifiable significance comprising, means for producing an original sound sequence having an identifiable significance in its entirety, magnetic tape recording means adapted to record said original sound sequence in reproducible form, said magnetic tape recording means comprising a magnetic strip, first and second recording heads, and a mechanism associated with said magnetic strip adapted to cause said strip to move at a uniform rate relative to said heads to record simultaneously the original sound by making two separate magnetic traces along regularly recurring primary recordation paths upon said magnetic strip, interrupter means adapted to produce modified first and second sound sequences from said original sound sequence, said interrupter means being associated with said first and second recording heads to remove each said recording head from its recurring primary path and after a time to return it thereto with the removal and return cycle of each said recording head being in alternate distinctly spaced intervals with respect to removal and return cycles of the other recording head, play-back means for reproducing each said modified sound sequence from said recordings by reproducing the sounds recorded on the traces along each said primary path, means for transmitting said play-back of said first modified sound sequence to one ear of said subject and means for transmitting said play-back of said second modified sound sequence to the other ear of said subject.

7. The apparatus according to claim 6 wherein said means for removing each said recording head from each said primary recordation path comprises means to transversely move each said recording head relative to said recordation path to provide a hiatus in the recorded trace upon said primary recordation path only when the other said recording head is upon its primary recording path and means for moving each said member transversely to return it to its primary recording path before the other recording member is next removed from its primary recording path.

8. The apparatus set forth in claim 7 in which said means for transverse movement comprises a lift cam mechanism and an offset cam mechanism adapted and arranged to raise and offset each said recording head and after a predetermined time interval to return it to its primary path.

9. The apparatus set forth in claim 7 wherein said means for raising, offsetting and returning each said recording head comprises a lift cam and a follower mechanism and an offset cam and follower mechanism, each of said cams and followers being adapted and arranged to provide relatively rapid movements of said recording heads when they are moved transversely from each respective primary path, and to provide relatively gradual transverse movements for returning each recording head to its primary path.

10. The apparatus set forth in claim 6 wherein said original sound sequence comprises a record of a human voice speaking messages having identifiable significance adapted to elicit specified responses from the test subject.

11. The apparatus of claim 6 wherein the means for producing an original sound having an identifiable significance comprises a means for producing a predetermined sequence of tone sounds of desired test characteristics.

12. Apparatus for testing the hearing of a test subject capable of making an identification response to an original sound sequence having an identifiable significance comprising: means for producing an original sound sequence having an identifiable significance in its entirety; recording means adapted to produce recordation traces of said original sound sequence in reproducible form, said recording means comprising a record receiving member, first and second recording means for recording said original sound sequence, and a mechanism associated with said record receiving member adapted to cause said member to move at a uniform rate relative to said first and second recording means so as to record simultaneously portions of the original sound on two separate traces along primray recordation paths upon said record receiving member; interrupter means associated with said first and second recording means to produce modified first and second recorded sound sequences from said original sound sequence, said interrupter means comprising a mechanism adapted to remove each said recording means from its primary path and after a time to return it thereto with the removal and return cycle of each said recording means being in alternate distinctly spaced intervals with respect to each removal and return cycle of the other recording means; play-back means for reproducing each said modified sound sequence from said modified first and second recorded sound sequences by reproducing the sounds recorded on the traces upon each said primary path; means for transmitting said play-back of said first modified sound sequence to one ear of said subject, means for transmitting said play-back of said second modified sound sequence to the other ear of said subject; and card recording means under the control of the subject adapted to record the identifiable significance of the original sound sequence as determined by the subject from the first and second modified sound sequences respectively transmitted to his separate ears.

13. For use with apparatus for testing hearing, a magnetic tape having two recordation traces of portions of an original sound sequence having an identifiable significance, each said recordation trace being recorded along a primary path arranged for play-back to reproduce the portions of said original sound recorded upon said traces, said recorded traces along each said primary path comprising recorded portions of the original sound sequence with hiatuses imposed therein to obscure the identifiable significance of the original sound sequence, and each said recordation trace along each primary path having its recorded portions and hiatuses disposed so that the hiatuses of one such path do not coincide with any of the hiatuses of the other path whereby the entire original sound sequence is recorded upon the two recordation traces taken in combination.

14. Recording apparatus for use in testing hearing by transmitting individually unidentifiable portions of an original identifiable sound sequence to separate ears of a test subject, comprising the combination of a means for producing an identifiable sound sequence, a record receiving member, first and second recording means adapted to record said sound sequence in reproducible form upon said record receiving member, and a mechanism adapted to cause relative movement between said record receiving member and said first and second recording means at a uniform rate along first and second primary recordation paths respectively upon said record receiving means so as to record simultaneously portions of said original sound sequence upon each said path, interrupter means adapted to produce modified first and second recorded sound sequences from said original sound sequence, said interrupter means being associated with said first and second recording means to move each said recording means from its primary recordation path and after a predetermined time to return it thereto, and automatic means to control the removal of each said recording means from its primary path so that the removal and return cycle of each said recording means is in alternate distinctly spaced intervals with respect to the removal and return cycles of the other recording means.

15. The apparatus set forth in claim 14 in which said means for transverse movement comprises an offset cam mechanism adapted and arranged to move each said recording means transversely relative to its primary path and after a predetermined time interval to return it to its primary path.

16. The apparatus of claim 14 in which each said first and second recording means comprises a magnetic tape recording head and said recording receiving member comprises a magnetic strip.

17. A method of testing the hearing of a test subject comprising preparing an indication of an original sound sequence of identifiable significance, separating said original sound sequence into two modified sound sequences each having hiatuses obscuring the significance of the original sound sequence, simultaneously transmitting one of said modified sound sequences to one ear of a test subject and the other modified sound sequence to the other ear of the test subject, preparing an indication of the sounds heard by the test subject, and comparing the indication of the sounds heard by the test subject with the indication of the original sound sequence.

18. A method of testing the hearing of a test subject comprising producing first and second sound sequences each having hiatuses, the sounds and hiatuses in each sound sequence being so disposed and of such character in relation to the sounds and hiatuses in the other sound sequence as to result in a combined sound sequence of identifiable significance when the first and second sound sequences are produced simultaneously, preparing an indication of said combined sound sequence, simultaneously transmitting the first sound sequence to one ear of the test subject and the second sound sequence to the other ear of the test subject, whereby a test subject of normal hearing will be enabled to determine the identifiable significance of the combined sound sequence, preparing an indication of the sounds heard by the test subject, and comparing the indication of the sounds heard by the test subject with the indication of the combined sound sequence.

19. Apparatus for testing hearing comprising means for producing first and second sound sequences each having hiatuses, the sounds and hiatuses in each sound sequence being so disposed and of such character in relation to the sounds and hiatuses in the other sound sequence as to result in a combined sound sequence of identifiable significance when the first and second sound sequences are produced simultaneously, and means for simultaneously transmitting each of the sound sequences to only one ear of a test subject.

20. A hearing testing method which comprises transmitting a variety of sounds containing instructions at various frequencies and intensities, including mixed frequencies, to a test subject, part of the sounds being transmitted to one ear of the test subject and part of the sounds being transmitted to the other ear of the test subject, said sounds being transmitted to the test subject under conditions of ambient noise, substantially all of said sounds being transmitted at an intensity level sufficient for a subject with normal hearing to identify and respond to the instructions included therein in a predetermined manner, comparing the responses of the test subject to the responses which would be given by a subject with normal hearing, determining from the test subject's responses the intensities at which the sounds must be transmitted to each of his ears in order for the test subject to respond in the said predetermined manner, and then transmitting a variety of sounds including instructions at various frequencies and intensities, including mixed frequencies, to the test subject, part of the sounds being transmitted to one ear of the test subject at the determined intensity for that ear, and part of the sounds being transmitted to the other ear of the test subject at the determined intensity for said other ear.

21. In an apparatus for testing hearing,
means for producing from an original sound sequence having an identifiable significance in its entirety, first and second modified sound sequences each of which comprises the original sound sequence with portions removed therefrom to obscure the original identifiable significance,
means for transmitting said first modified sound sequence to only one ear of a test subject,
and means for transmitting said second modified sound sequence to only the other ear of the test subject,
whereby a test subject with normal hearing will be enabled to determine the identifiable significance of the original sound sequence.

22. Apparatus comprising
means for producing an original sound sequence having predetermined characteristics of frequencies and volumes and having an identifiable significance in its entirety,
means for recording said original sequence,
play-back means for producing simultaneously from said original sound sequence first and second modified sound sequences each of which comprises the original sound sequence with a plurality of portions removed therefrom to obscure the original identifiable significance, and
means associated with said play-back means adapted to remove said portions from the original sound sequence to impose hiatuses which alternate successively between said first and second modified sound sequence and provide an interval of time between the end of each imposed hiatus in each one of said sound sequences and the next succeeding hiatus provided in the alternate sound sequence so that the first and second modified sound sequences may be reproduced simultaneously and during simultaneous reproduction no imposed hiatus in one of said modified sound sequences will coincide with any hiatus in the other modified sound sequence.

23. A method of testing the hearing of a test subject comprising the steps of:

separating a sound sequence of identifiable significance and desired testing characteristics into two modified sound sequences each having hiatuses obscuring the significance of the original sound sequence, said hiatuses being so timed that no hiatus in one modified sound sequence overlaps any hiatus in the other modified sound sequence, and simultaneously transmitting one of said modified sound sequences to only one ear of a test subject and the other modified sound sequence to only the other ear of the test subject.

24. A method as defined by claim 23 and including the step of providing an interval of time between the end of each hiatus in each one of said sound sequences and the next succeeding hiatus in the other sound sequence when the two are reproduced simultaneously.

References Cited by the Examiner

UNITED STATES PATENTS

| 2,114,680 | 4/1938 | Goldsmith | 179—1 |
| 2,558,853 | 7/1951 | Kappeler | 179—100.2 |
| 2,768,237 | 10/1956 | Faulkner | 179—1 |
| 2,792,449 | 5/1957 | Bottini | 179—13 |
| 2,869,666 | 1/1959 | Webster | 179—1 |
| 2,911,482 | 11/1959 | Dostert | 179—100.2 |

ROBERT H. ROSE, *Primary Examiner.*